(12) United States Patent
Cevik et al.

(10) Patent No.: US 12,136,516 B2
(45) Date of Patent: *Nov. 5, 2024

(54) NANOCOMPOSITE SUPERCAPACITOR

(71) Applicant: Imam Abdulrahman Bin Faisal University, Dammam (SA)

(72) Inventors: Emre Cevik, Dammam (SA); Munerah Abdullah Almessiere, Dammam (SA); Abdulhadi Baykal, Dammam (SA); Ayhan Bozkurt, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/742,362

(22) Filed: Jun. 13, 2024

(65) Prior Publication Data
US 2024/0331954 A1    Oct. 3, 2024

Related U.S. Application Data

(63) Continuation of application No. 18/599,706, filed on Mar. 8, 2024, now Pat. No. 12,027,313, which is a
(Continued)

(51) Int. Cl.
*H01G 11/46* (2013.01)
*H01G 11/24* (2013.01)
(Continued)

(52) U.S. Cl.
CPC ............. *H01G 11/46* (2013.01); *H01G 11/24* (2013.01); *H01G 11/36* (2013.01); *H01G 11/38* (2013.01); *H01G 11/52* (2013.01)

(58) Field of Classification Search
CPC ........ H01G 11/04; H01G 11/52; H01G 11/38; H01G 11/36; H01G 11/24; H01G 11/46
See application file for complete search history.

(56) References Cited

U.S. PATENT DOCUMENTS

11,961,668 B2    4/2024   Cevik
12,027,313 B1 *  7/2024   Cevik .................... H01G 11/46
(Continued)

FOREIGN PATENT DOCUMENTS

CN   101702379 A   5/2010
CN   103030208 A   4/2013
(Continued)

OTHER PUBLICATIONS

Zongxiao Wu, et al., "Vanadium doped hierarchical porous nickel-cobalt layered double hydroxides nanosheet arrays for high-performance supercapacitor", Journal of Alloys and Compounds, vol. 838, Oct. 15, 2020, 2 pages (Abstract only).
(Continued)

*Primary Examiner* — David M Sinclair
(74) *Attorney, Agent, or Firm* — Oblon, McClelland, Maier & Neustadt, L.L.P.

(57) ABSTRACT

A nanocomposite electrode and supercapacitor thereof are disclosed. The nanocomposite electrode includes a substrate, at least one binding compound, at least one carbonaceous compound, and vanadium doped spinel ferrite nanoparticles (V-SFNPs). The V-SFNPs have a formula of $Co_xNi_{1-x}V_yFe_{2-y}O_z$, wherein $x=0.1-0.9$, $y=0.01-0.10$, and $z=3-5$. The substrate is at least partially coated on a first side with a mixture comprising the V-SFNPs, the at least one
(Continued)

binding compound, and the at least one carbonaceous compound. Two of the nanocomposite electrodes are combined to form the supercapacitor.

12 Claims, 36 Drawing Sheets

Related U.S. Application Data continuation of application No. 17/719,437, filed on Apr. 13, 2022, now Pat. No. 11,961,668.

(51) Int. Cl.
*H01G 11/36* (2013.01)
*H01G 11/38* (2013.01)
*H01G 11/52* (2013.01)

(56) References Cited

U.S. PATENT DOCUMENTS

2014/0177136 A1 6/2014 Kim et al.
2022/0172902 A1* 6/2022 Ho .................... H01G 9/035

FOREIGN PATENT DOCUMENTS

CN 110534351 A 12/2019
CN 113470985 A 10/2021
TW 417118 B 1/2001

OTHER PUBLICATIONS

Zein K. Heiba, et al., "Effect of vanadium doping on structural and magnetic properties of defective nano-nickel ferrite", Applied Physics A, vol. 124, Article No. 290, Mar. 10, 2018, 13 pages (Abstract only).

Nyemaga Masanje Malima, et al., "Solventless synthesis of nanospinel $Ni_{1-x}Co_xFe_2O_4$ ($0 \leq x \leq 1$) solid solutions for efficient electrochemical water splitting and supercapacitance", RSC Advances, vol. 11, Sep. 20, 2021, pp. 31002-31014.

Bharadwaj et al., Study of magneto-supercapacitance properties of nickel cobalt ferrite-activated carbon composite, J. Energy Storage, 36 (2021), Article 102444, 10.1016/j.est.2021.102444 (Year: 2021).

* cited by examiner

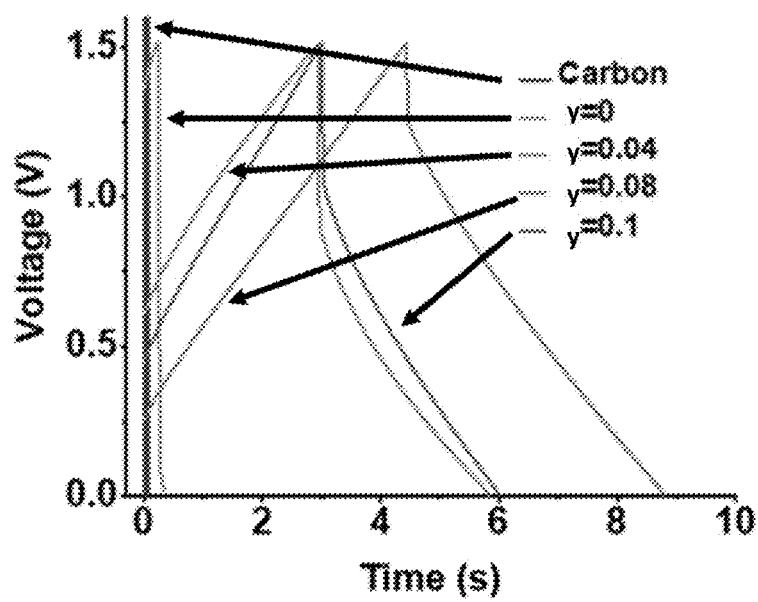

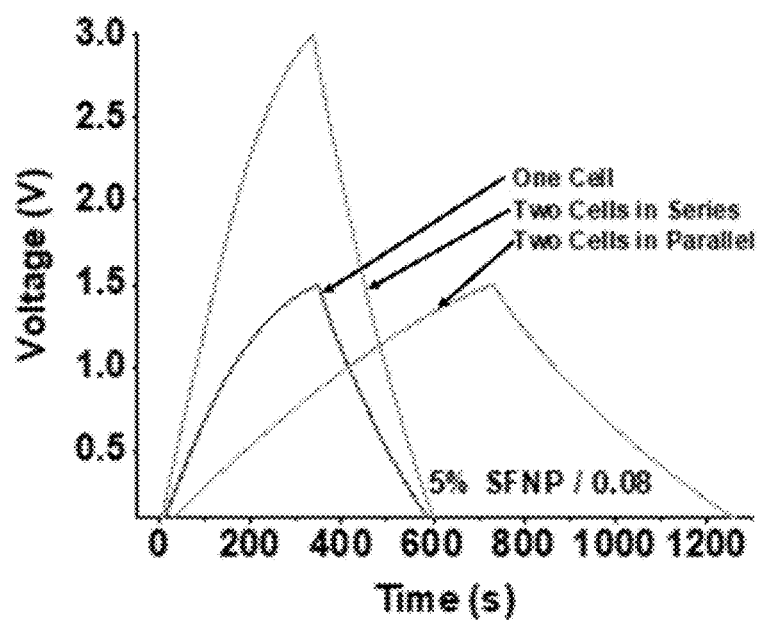

NANOCOMPOSITE SUPERCAPACITOR

CROSS-REFERENCE TO RELATED APPLICATIONS

The present application is a Continuation of U.S. application Ser. No. 18/599,706, now allowed, having a filing date of Mar. 8, 2024, which is a Continuation of U.S. application Ser. No. 17/719,437, now U.S. Pat. No. 11,961,668, having a filing date of Apr. 13, 2022.

STATEMENT OF PRIOR DISCLOSURE BY THE INVENTOR

Aspects of the present disclosure are described in Alqarni, et.al., "Synthesis and design of vanadium intercalated spinal ferrite ($Co_{0.5}Ni_{0.5}V_xFe_{1.6-x}O_4$) electrodes for high current supercapacitor applications", 12 Mar. 2022; Journal of Energy Storage; 51; 104357, incorporated herein by reference in its entirety.

BACKGROUND OF THE INVENTION

Field of the Invention

The present disclosure is directed to an electrode, and particularly to a nanocomposite electrode, and a supercapacitor thereof.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Supercapacitors display high power densities, fast charging-discharging rates, and enhanced longevity and therefore are in high demand for energy storage applications.

Recently, research has concentrated on the development of low cost and high capacitance nanocomposite electrode materials for energy storage systems. Among nanocomposite materials, transition metal oxides such as spinel ferrite nanoparticles (SFNPs) with the formula $AFe_2O_4$ (A=Mn, Mg, Co, Ni, Zn), are great candidates for supercapacitor materials due to their superior catalytic and electrochemical faradaic properties. Although, supercapacitors have been made with nanocomposite materials, at high currents, due to high voltage drops, they show a consequent low energy density and irregular stability problems. Therefore, spinel ferrite nanomaterials should be optimized to enhance supercapacitor energy storage capabilities.

Accordingly, it is an object of the present disclosure to provide a vanadium doped spinel ferrite nanocomposite as an electrode material and an electrode and supercapacitor that contain the vanadium doped spinel ferrite nanocomposite.

SUMMARY

The foregoing general description of the illustrative present disclosure and the following detailed description thereof are merely exemplary aspects of the teachings of this disclosure and are not restrictive.

The present disclosure presents a nanocomposite electrode, including a substrate, at least one binding compound, at least one carbonaceous compound, and vanadium doped spinel ferrite nanoparticles (V-SFNPs). The V-SFNPs have a formula of $Co_xNi_{1-x}V_yFe_{2-y}O_z$ wherein x=0.1-0.9, y=0.01-0.10, and z=3-5. The substrate is at least partially coated on a first side with a mixture comprising the V-SFNPs, the at least one binding compound, and the at least one carbonaceous compound.

In an embodiment, the V-SFNPs have a substantially spherical shape and an average size of 10-1000 nm.

In an embodiment, the V-SFNPs have 20-30 wt % oxygen, 1-10 wt % vanadium, 40-50 wt % iron, 10-20 wt % cobalt, and 10-20 wt % nickel, based on the total weight of the oxygen, vanadium, iron, cobalt, and nickel.

In an embodiment, the mixture has 1-20 wt. % of the V-SFNPs and 80-99 wt. % of the binding compound, and the carbonaceous compound based on the total weight of the V-SFNPs, the binding compound, and the carbonaceous compound.

In an embodiment, the nanocomposite electrode has 85-92 wt % carbon, 5-10 wt % oxygen, 0.1-2 wt % vanadium, 0.5-2 wt % iron, 0.5-1 wt % cobalt, and 0.5-1 wt % nickel, based on the total weight of the carbon, oxygen, vanadium, iron, cobalt, and nickel.

In an embodiment, the binding compound is at least one selected from the group consisting of polyvinylidene fluoride and N-methyl pyrrolidone.

In an embodiment, the carbonaceous compound is at least one selected from the group consisting of graphite, activated carbon, reduced graphene oxide, carbon nanotubes, carbon nanofibers, and carbon black.

In an embodiment, the substrate is made from at least one material selected from the group consisting of stainless steel, aluminum, nickel, copper, platinum, zinc, tungsten, and titanium.

In an embodiment, a supercapacitor including the nanocomposite electrode has at least one electrolyte and a separator. Two of the nanocomposite electrodes form a layered structure with the first sides of the substrates facing inward and a second side of the substrates not coated with the mixture facing outward. The at least one electrolyte and the separator are between and in direct contact with the first sides of the nanocomposite electrodes to form the supercapacitor.

In an embodiment, the electrolyte is at least one selected from a group consisting of an alkali metal salt and an alkaline earth metal salt and has a molarity of 1-10 in water.

In an embodiment, the separator is selected from a group consisting of a polypropylene membrane, a glass fiber membrane, and a cellulose fiber membrane.

In an embodiment, the supercapacitor has an energy density of 50-80 Wh/kg at a power density of 500-8000 W/kg.

In an embodiment, the supercapacitor has a specific capacitance of 325-375 F/g at 1 mA.

In an embodiment, the supercapacitor maintains least 90% of the initial specific capacitance after 10,000 charge discharge cycles.

In an embodiment, a power bank includes 2-10 of the supercapacitors connected in parallel and/or series.

In an embodiment, the supercapacitor has an equivalent series resistance of 1.5-5 Ohm.

In an embodiment, the supercapacitor is electrically connected to a sensor, and functions as a battery in a wearable device.

The present disclosure also provides a method of making the V-SFNPs. The method includes mixing a cobalt (II) salt, a nickel salt, an iron (III) salt, and a vanadium (III) salt in water to form a mixture. Adjusting the pH of the mixture to 10-12 with a base to form a basic mixture. Heating the basic mixture to 150-200° C. for 10-20 hours to form a powder. Washing the powder with water and drying at a temperature of 60-80° C. to form the V-SFNPs.

The present disclosure also provides a method of making the nanocomposite electrode. The method includes mixing the binding compound and the carbonaceous compound for 1-4 hours at a temperature of 50-70° C. to form a paste. Adding 1-20 wt. % of the V-SFNPs, based on the total weight of the binding compound, the carbonaceous compound, and the V-SFNPs, into the paste and sonicating for 10-30 minutes creating a mixture. Coating the mixture onto the substrate to form the nanocomposite electrode. Drying the nanocomposite electrode at a temperature less than 100° C.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 4A-4F are graphs illustrating the GCD profiles of the supercapacitor device A) pure carbon B) 5% SFNPs (y=0.00) containing carbon C) 5% SFNPs/0.04 D) 5% SFNPs/0.08 E) 5% SFNPs/0.1 at different charge-discharge current 1-40 mA F) A comparative GCD profile of the devices at 40 mA;

FIGS. 5A-5E illustrate the A) specific capacitance calculated from cyclic voltammetry, B) Ragone plots of the SFNPs at different ratios, C) GCD measurements of series and parallel connected SC devices. Time dependent images of, D) one SC device, E) two SC devices in operating LED.

DETAILED DESCRIPTION

Figure 1A:
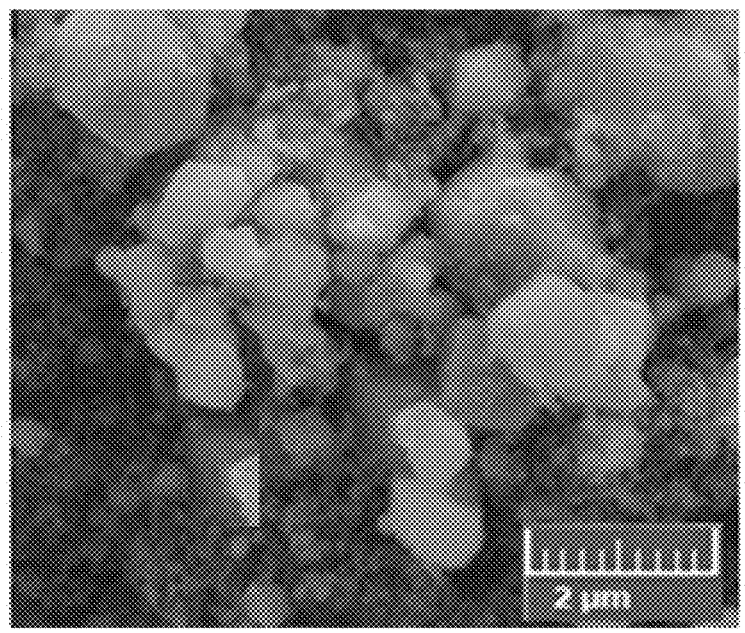
FIGS. 1A-1H illustrate (A-D) SEM images of $Co_{0.5}Ni_{0.5}V_yFe_{2-y}O_4$ (y=0.00, 0.04, 0.08 and 0.10) SFNPs, respectively (E) EDX spectrum of $Co_{0.5}Ni_{0.5}V_yFe_{2-y}O_4$ (y=0.04) SFNPs, (F-G) TEM images of $Co_{0.5}Ni_{0.5}V_yFe_{2-y}O_4$ (y=0.04) SFNPs, (H) XRD patterns of $Co_{0.5}Ni_{0.5}V_yFe_{2-y}O_4$ (y=0.00, 0.04, 0.08 and 0.10) SFNPs.
Figure 1B:
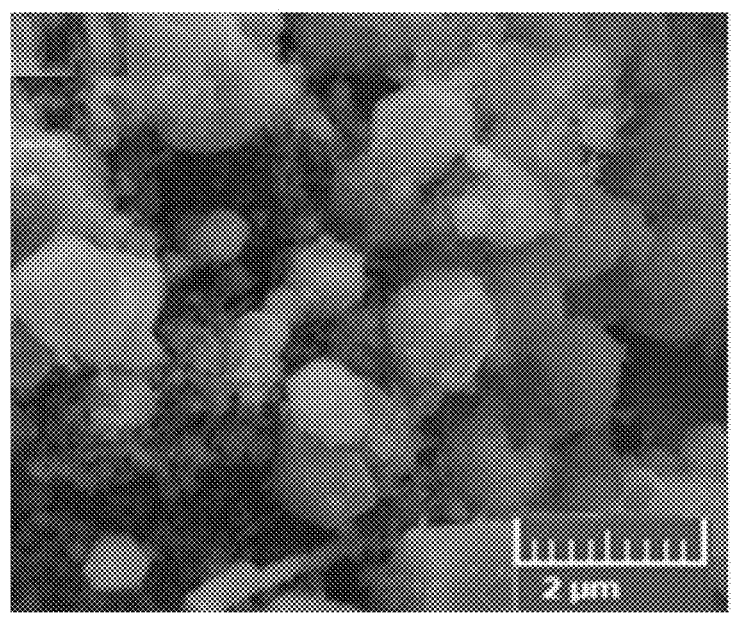
Figure 1C:
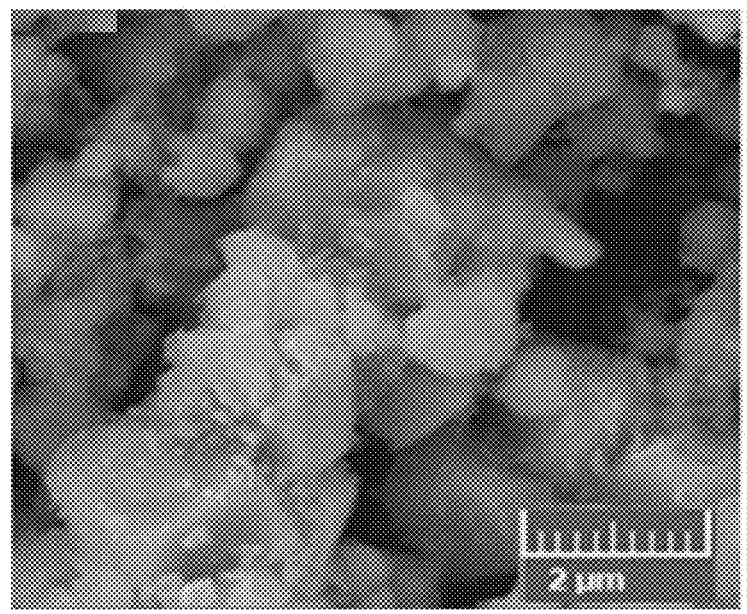
Figure 1D:
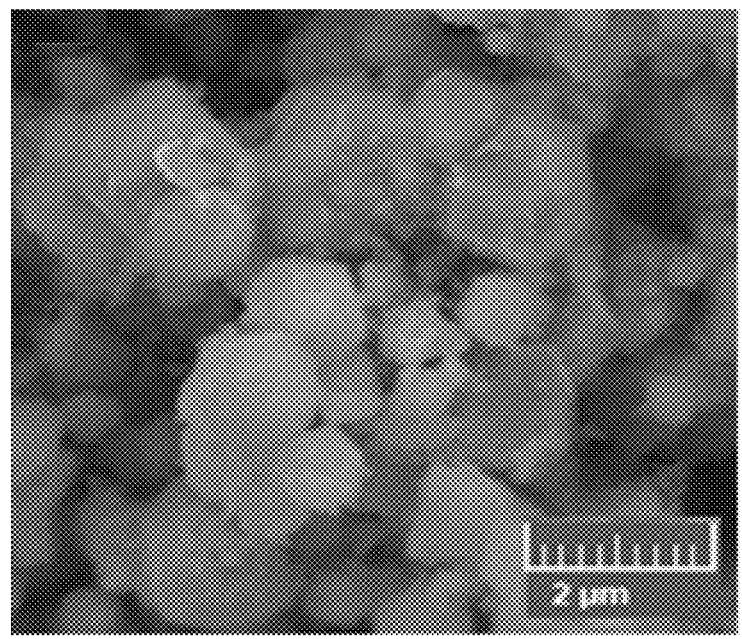

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

As used herein, "substrate" refers to a substrate including a conducting material, which may be, but is not in any manner limited to, metals, metal alloys, and other conducting materials.

As used herein, "electrolyte" refers to substances that conduct electric current because of dissociation of the electrolyte into positively and negatively charged ions.

As used herein, "binding compound" or "binding agent" or "binder" refers to compounds or substances which holds or draws other materials together to form a cohesive whole mechanically, chemically, by adhesion or cohesion.

As used herein, "conductive additive" refers to substances or compounds or materials which when added to another substance or compound or material of low electrical conductivity, increase the conductivity thereof.

As used herein, a "voltammogram" is a graph that can be drawn after an electrochemical experiment. This graph has a typical, recognizable form in which the electron flow (current: I) is measured in Volts against the potential (E).

As used herein, "amount" refers to the level or concentration of one or more reactants, catalysts, present in a reaction mixture.

The use of the singular herein includes the plural (and vice versa) unless specifically stated otherwise.

The use of the terms "include," "includes", "including," "have," "has," or "having," "comprise," "comprises," "comprising" or the like should be generally understood as open-ended and non-limiting unless specifically stated otherwise.

It is understood that the order of steps or order for performing certain actions can be changed so long as the intended result is obtained. Moreover, two or more steps or actions may be conducted simultaneously.

Aspects of the present invention are directed toward a nanocomposite electrode, otherwise referred to as the 'electrode'. In this study, a hydrothermal technique was used to synthesize vanadium doped spinel ferrite nanoparticles, referred to as V-SFNPs, having a formula of $Co_xNi_{1-x}V_yFe_{2-y}O_z$ wherein x=0.1-0.9, y=0.01-0.10, and z=3-5. Nanocomposite electrodes were fabricated by combining a carbonaceous compound with different weight fractions of V-SFNPs to investigate the impact of the co-addition on the performance. A supercapacitor was further prepared and characterized based on a symmetric device with two of the electrodes. The prepared nanocomposite electrode and supercapacitor were characterized using various analytical techniques and the electrochemical properties were studied. The nanocomposite electrode and supercapacitor of the present disclosure provide high stability, cost-effectiveness, and enhanced electrochemical performance.

A method of making the V-SFNPs is disclosed. The order in which the method is described is not intended to be construed as a limitation, and any number of the described method steps can be combined in any order to implement the method. Additionally, individual steps may be removed or skipped from the method without departing from the spirit and scope of the present disclosure.

In an embodiment, the V-SFNPs are made by mixing a cobalt (II) salt, a nickel salt, an iron (III) salt, and a vanadium (III) salt in water to form a mixture. In an embodiment, the cobalt (II) salt is selected from the group consisting of cobalt nitrate, cobalt chloride, cobalt sulfate, cobalt carbonate, and hydrates thereof. In an embodiment, the nickel salt is selected from the group consisting of nickel nitrate, nickel chloride, nickel sulfate, nickel carbonate, and hydrates thereof. In an embodiment, the iron (III) salt is selected from the group consisting of iron nitrate, iron chloride, iron sulfate, iron carbonate, and hydrates thereof. In an embodiment, the vanadium (III) salt is selected from the group consisting of vanadium nitrate, vanadium chloride, vanadium sulfate, vanadium carbonate, and hydrates thereof. In an embodiment, the cobalt (II) salt is cobalt nitrate hexahydrate, the nickel salt is nickel nitrate hexahydrate, the iron (III) salt is iron nitrate nonahydrate, and the vanadium (III) salt is vanadium chloride.

In an embodiment, the pH of the mixture is adjusted to 10-12 with a base to form a basic mixture. In an embodiment, the base is any known base such as but not limited to sodium hydroxide, potassium hydroxide, and ammonia. In and embodiment, the basic mixture is heated to 150-200° C., preferably 160-190, or 170-180° C. for 10-20 hours, preferably 11-15 hours, or 12-13 hours, to form a powder. In an embodiment, the mixture is heated in an autoclave. In an embodiment, the powder is washed with water and dried at a temperature of 60-80° C., preferably 65-75, or 65-70° C. to form the V-SFNPs.

In an embodiment, the amount of vanadium in the V-SFNPs is varied based on the amount of vanadium (III) salt added to the mixture. In an embodiment, the amount of cobalt in the V-SFNPs is varied based on the amount of cobalt (II) salt added to the mixture. In an embodiment, the amount of nickel in the V-SFNPs is varied based on the amount of nickel salt added to the mixture. In an embodiment, the V-SFNPs have a formula of $Co_xNi_{1-x}V_yFe_{2-y}O_z$ x=0.1-0.9, y=0.00-0.10, and z=3-5. The varying amount of vanadium in the V-SFNPs may be labeled as $Co_xNi_{1-x}V_yFe_{2-y}O_z$ (y=0.00, 0.04, 0.08 and 0.10) throughout the present disclosure.

Figure 1E:
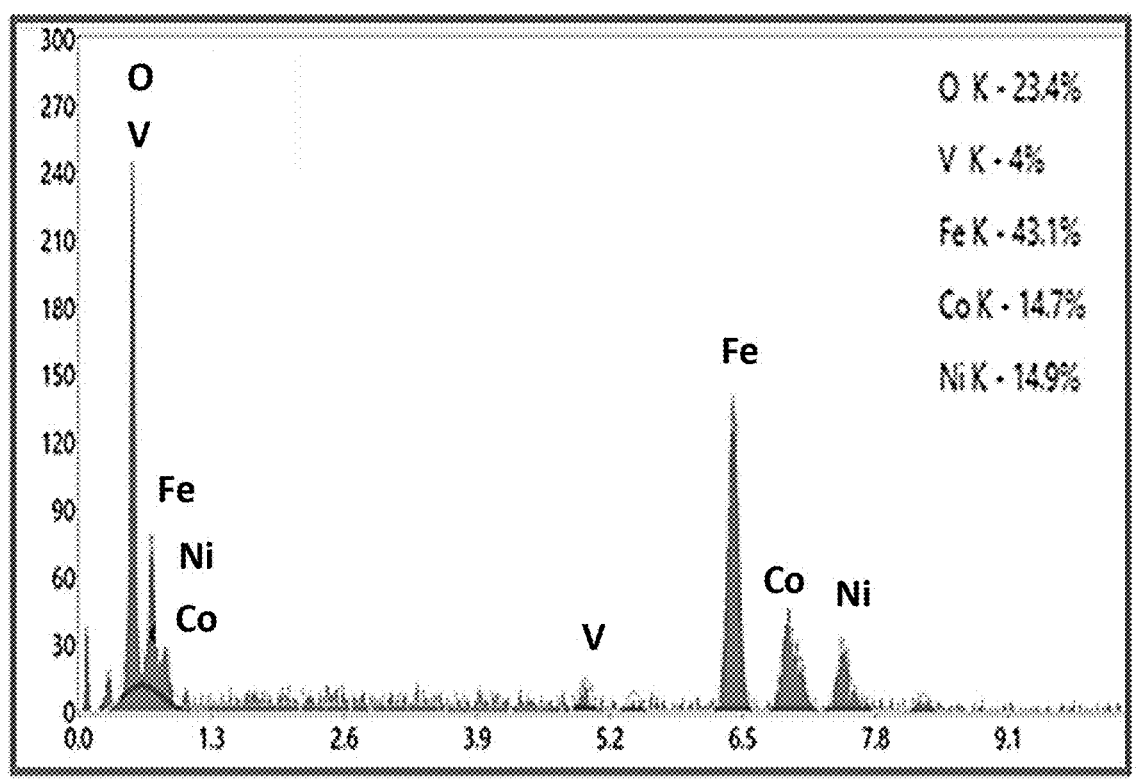

In an embodiment, the V-SFNPs have a substantially spherical shape and an average size of 10-1000 nm, preferably 100-800 nm, or 400-500 nm. In an embodiment, the V-SFNPs have an inhomogeneous particle size distribution. In an embodiment, the V-SFNPs are aggregated. In an embodiment, the V-SFNPs XRD pattern (FIG. 1H) reveals the formation of a cubic crystal structure. In an embodiment, the crystal structure may be triclinic, monoclinic, orthorhombic, tetragonal, or hexagonal. In an embodiment, the (220) peak is at 28-32°, preferably, 28.5-31.5°, or 29-30.5°, the (311) peak is at 34-38°, preferably 35-37°, or 35.5-36°, the (222) peak is at 36-40°, preferably 37-39°, or 38-38.5°, the (400) peak is 42-46°, preferably 43-45°, or 44-44.5°, the (422) peak is 52-56°, preferably 53-55°, or 54-54.5°, the (511) peak is 55-59°, preferably 56-58°, or 57-57.5°, and the (440) peak is 62-66°, preferably 63-65°, or 64-64.5°. In an embodiment, the size of the unit cell, the volume, and the interatomic spacing, increase with increasing amounts of vanadium in the V-SFNPs. In an embodiment, the V-SFNPs crystal size is 8.0-9.0 Å, preferably 8.2-8.5, or 8.3-8.4 Å. In an embodiment, the volume of the V-SFNPs crystals is 570-600 Å$^3$, preferably 580-595, or 585-590 Å$^3$. In an embodiment, the interatomic spacing of the V-SFNPs crystals is 20-40 nm, preferably 25-38, or 30-35 nm.

In an embodiment, the V-SFNPs have 20-30 wt % oxygen (O), preferably 22-28 wt %, or 24-26 wt %, 1-10 wt % vanadium (V) preferably 2-8 wt %, or 3-6 wt %, 40-50 wt % iron (Fe), preferably 42-48 wt %, or 44-46 wt %, 10-20 wt % cobalt (Co), preferably 12-18 wt %, or 14-16 wt %, and 10-20 wt % nickel (Ni), preferably 12-18 wt %, or 14-16 wt % based on the total weight of the oxygen, vanadium, iron, cobalt, and nickel. In an embodiment, a V-SFNP with the formula $Co_{0.5}Ni_{0.5}V_{0.04}Fe_{1.96}O_4$ has 23.4% 0, 4% V, 43.1% Fe, 14.7% Co, and 14.9% Ni.

The present disclosure describes a nanocomposite electrode, including a substrate, at least one binding compound, at least one carbonaceous compound, and the V-SFNPs. The substrate is at least partially coated on a first side with a mixture comprising the V-SFNPs, the at least one binding compound, and the at least one carbonaceous compound. In an embodiment, the first side of the substrate is 50% coated with the mixture, preferably 60%, 70%, 80%, 90%, or 100% coated.

In one embodiment, the binding compound is one or more selected from a group consisting of polyvinylidene fluoride (PVDF)-based polymers, and its co- and terpolymers with hexafluoro ethylene, tetrafluoroethylene, chlorotrifluoroethylene, polyvinyl fluoride), polytetrafluoroethylene (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene propylene diene terpolymers (EPDM), styrene-butadiene rubbers (SBR), polyimides, ethylene-vinyl acetate copolymers. In an embodiment, the binding compound is at least one selected from the group consisting of polyvinylidene fluoride and N-methyl pyrrolidone. In an embodiment, the binding compound is a combination of N-methyl pyrrolidone and PVDF. In an embodiment, the carbonaceous compound is at least one selected from the group consisting of graphite, activated carbon, reduced graphene oxide, carbon nanotubes, carbon nanofibers, and carbon black. In an embodiment, the carbonaceous compound is a combination of activated carbon and carbon black. In an embodiment, the substrate is made from at least one material selected from the group consisting of stainless steel, aluminum, nickel, copper, platinum, zinc, tungsten, and titanium. In an embodiment, the substrate is made from aluminum.

In an embodiment, the mixture has 1-20 wt. %, preferably 5-15 wt %, or 8-12 wt % of the V-SFNPs and 80-99 wt. %, preferably 85-95 wt %, or 88-92 wt % of the binding compound, and the carbonaceous compound based on the total weight of the V-SFNPs, the binding compound, and the carbonaceous compound. In an embodiment, the electrodes are porous thereby improving the hydrophilic behavior and increasing the electrolyte adsorption capacity thus improving device performance. In an embodiment, the elements C, O, Ni, V, Fe, and Co are homogenously distributed throughout the nanocomposite electrode.

In an embodiment, the nanocomposite electrode has 85-92 wt % C, preferably 86-90, or 88-90 wt %, 5-10 wt % O, preferably 6-9, or 7-8 wt %, 0.1-2 wt % V, preferably 0.2-1, or 0.4-0.8 wt %, 0.5-2 wt % Fe, preferably 0.7-1.5, or 1-1.3 wt %, 0.5-1 wt % Co, 0.6-0.9, or 0.7-0.8 wt % and 0.5-1 wt % Ni, preferably 0.6-0.9, or 0.7-0.8 wt %, based on the total weight of the carbon, oxygen, vanadium, iron, cobalt, and nickel. In an embodiment, 5 wt % in the mixture of a V-SFNP with the formula $Co_{0.5}Ni_{0.5}V_{0.08}Fe_{1.92}O_4$ has 90.2% C, 7.1% O, 0.3% V, 1.2% Fe, 0.6% Co, and 0.6% Ni.

A method of making the nanocomposite electrode is disclosed. The method includes mixing the binding compound and the carbonaceous compound for 1-4 hours, preferably 2-3 hours at a temperature of 50-70° C., preferably 55-65, or approximately 60° C. to form a paste. Adding 1-20 wt. % of the V-SFNPs, preferably 5-15 wt %, or 8-12 wt %, based on the total weight of the binding compound, the carbonaceous compound, and the V-SFNPs, into the paste and sonicating for 10-30 minutes, preferably 15-25 mins or approximately 20 mins creating a mixture. The method includes, coating the mixture onto the first side of the substrate to form the nanocomposite electrode. In an embodiment, the substrate is coated with an automatic coating machine. In an embodiment, the coating is 100 nm-50 μm thick, preferably 500-30 μm, or 10-20 μm. In an embodiment, the coating is 25 μm thick on the substrate surface. In an embodiment, a pneumatic disc cutter is used to cut the electrodes into a desired shape and size. In an embodiment, the electrode may be but is not limited to circular, square, rectangular, or triangular. In an embodiment, the electrodes are 10 mm×10 mm, preferably 5×5 mm or 2×2 mm in size. The method further includes, drying the nanocomposite electrode at a temperature less than 100° C., preferably 40-80, or 60-70° C.

Figure 7:
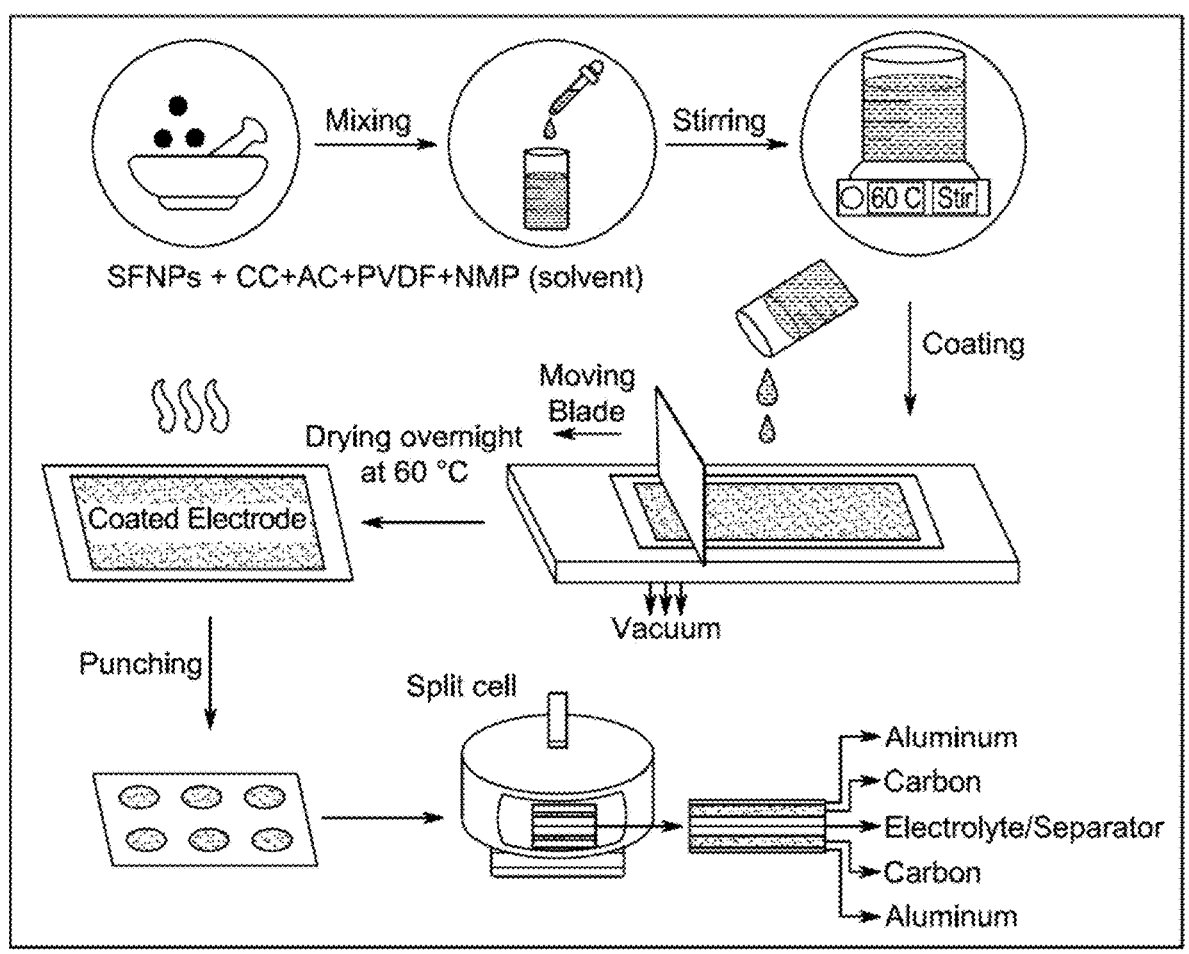
FIG. 7 is a schematic representation of the preparation of carbon nanocomposite paste, casting of carbon nanocomposite paste on an aluminum current collector, electrode cutting, split cell device configuration.

FIG. 7 illustrates an embodiment of a preparing the nanocomposite electrode. The order and components in which the structure is described is not intended to be construed as a limitation, and any number of the described components can be combined or changed in any order to form the supercapacitor. Additionally, individual components may be removed or skipped without departing from the spirit and scope of the present disclosure.

In an embodiment, a supercapacitor including the nanocomposite electrode also includes least one electrolyte and a separator. Two of the nanocomposite electrodes form a layered structure with the first sides of the substrates facing inward and a second side of the substrates not coated with the mixture facing outward. The at least one electrolyte and the separator are between and in direct contact with the first sides of the nanocomposite electrodes to form the supercapacitor.

In an embodiment, the electrolyte is at least one selected from a group consisting of an alkali metal salt and an alkaline earth metal salt and has a molarity (M) of 1-10 in water. In an embodiment, the electrolyte is 2 M sodium sulfate. The separator creates a boundary between the electrodes. In an embodiment, the separator is selected from a group consisting of a polypropylene membrane, a glass fiber membrane, and a cellulose fiber membrane.

FIG. 7 illustrates an embodiment of the disclosure relating to a supercapacitor. In an embodiment, the supercapacitor has an energy density of 50-80 Wh/kg, preferably 60-75 Wh/kg, or 70-75 Wh/kg at a power density of 500-8000 W/kg. In an embodiment, the supercapacitor has a specific capacitance of 325-375 F/g, preferably 330-360 F/g, or 340-350 F/g at 1 mA. In an embodiment, the supercapacitor maintains least 90%, preferably 95%, or 100% of the initial specific capacitance after 10,000 charge discharge cycles.

In an embodiment, a power bank includes 2-10 of the supercapacitors connected in parallel and/or series. In an embodiment, the supercapacitor has an equivalent series resistance of 1.5-5 Ohm, preferably 1.5-3, or 1.5-2 Ohm. In an embodiment, the supercapacitor is electrically connected to a sensor, and functions as a battery in a wearable device.

EXAMPLES

The following examples describe and demonstrate a nanoelectrode composite, and the method for making a nanoelectrode composite, and exemplary embodiments of the synthesis of vanadium doped spinel ferrite nanoparticles described herein. The examples are provided solely for the purpose of illustration and are not to be construed as limitations of the present disclosure, as many variations thereof are possible without departing from the spirit and scope of the present disclosure.

Example 1: Materials

Cobalt nitrate hexahydrate ($Co(NO_3)_2 \cdot 6H_2O$), nickel nitrate hexahydrate ($Ni(NO_3)_2 \cdot 6H_2O$), iron nitrate nonahydrate ($Fe(NO_3)_3 \cdot 9H_2O$) and vanadium chloride ($VCl_3$). Electrode materials (2-Kuraray active carbon (AC), conductive carbon (CB)) and aluminum current collector were purchased from MTI Corporation, USA. HSV 900 PVDF (polyvinylidene fluoride, PVDF, binder for electrode) and N-methyl pyrrolidone (NMP) were acquired from Merck. Electrolyte material is 2M $NaSO_4$.

Example 2: Synthesis of $Co_{0.5}Ni_{0.5}V_yFe_{2-y}O_4$ SFNPs

Cobalt (II) nitrate, nickel nitrate, ferric nitrate, and vanadium (III) chloride was utilized to fabricate $Co_{0.5}Ni_{0.5}V_yFe_{2-y}O_4$ (y=0.00, 0.04, 0.08 and 0.10) SFNPs by using hydrothermal approach. The stoichiometric amounts of metal nitrates and chloride were thawed in 20 mL of distilled water with continual stirring for 1 h. The pH was adjusted to (10-12) by adding 1M NaOH with stirring for 10 min., the mixture was transferred to stainless steel—Teflon autoclave and heated at 180° C. for 12 h in an oven. The final powder was washed with distilled water many times and left to dry overnight.

Example 3: Electrolyte and Electrode Preparation

Liquid electrolyte (2M of $Na_2SO_4$) was prepared by dissolving 2 moles solid $Na_2SO_4$ in 1 L of DI $H_2O$. FIG. 7 shows the diagram for the preparation of nanocomposite carbon electrodes. The electrodes were fabricated by using 0.4 g of AC, 0.05 g of CB and 0.05 g of PVDF. Carbon composite electrode paste was prepared by continuous mixing of AC, CB, and PVDF with NMP as solvent on a hot plate for 2 h continuous stirring at 60° C. After obtaining a homogeneous carbon paste, SFNPs were added to the carbon paste with different weight percentages (1, 5, 10 and 20). The resulting paste was kept in an ultrasonic water bath for 15 min., until a homogeneous mixture is reached. Constant stirring was applied to mix the SFNPs containing carbon paste for 1 h at 60° C. before it was used. Carbon paste containing SFNPs was applied homogeneously on an aluminum substrate with a thickness of 25 μm by a coating machine (MRX Shenzhen Automation Equipment). The carbon nanocomposite coated aluminum sheet was then placed in a 60° C. oven for 24 h as shown in FIG. 7. The die cutting machine was used to cut the disc electrodes into circular shapes using a disc cutter (Hi-Throughput Precision Pneumatic Disc Cutter). The electrodes are built as a sandwich type structure inside the split cell. The first layer of the electrode was placed inside the cell and a paper-based low-cost separator was used to separate the electrodes, after which liquid electrolyte was injected into the device. The second layer of the electrode was placed into the supercapacitor device.

All electrochemical measurements were performed on a two-electrode system. CV measurements were performed at a scanning speed between 10-200 mV s$^{-1}$ and EIS measurements were obtained in a frequency ranges 0.01 to 100 kHz using the CorrTest multi-channel electrochemical workstation. Galvanostatic charge/discharge (GCD) tests were performed on a supercapacitor at a potential window 0.5 to 1.5 V at various current densities starting from 1 mA to 40 mA.

Figure 1F:
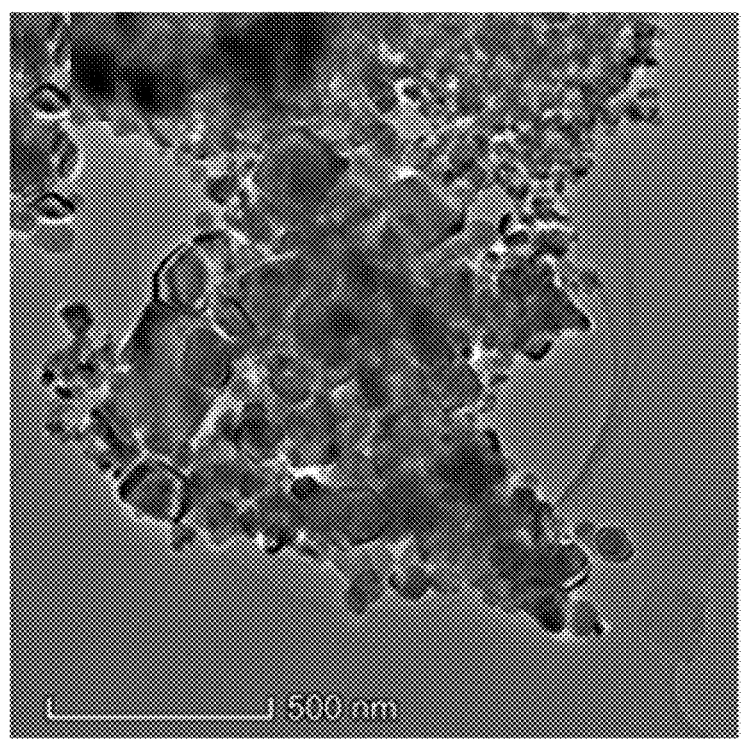
Figure 1G:
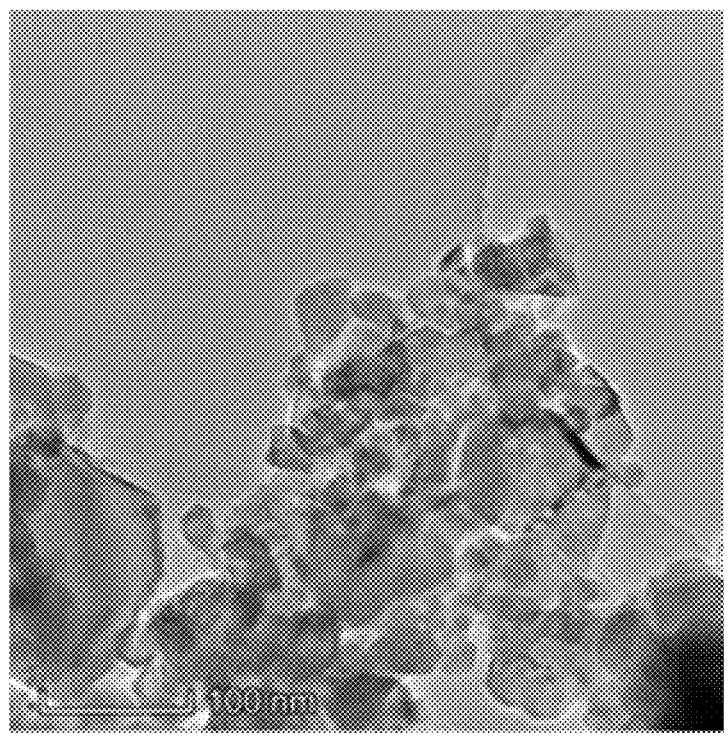
Figure 1H:
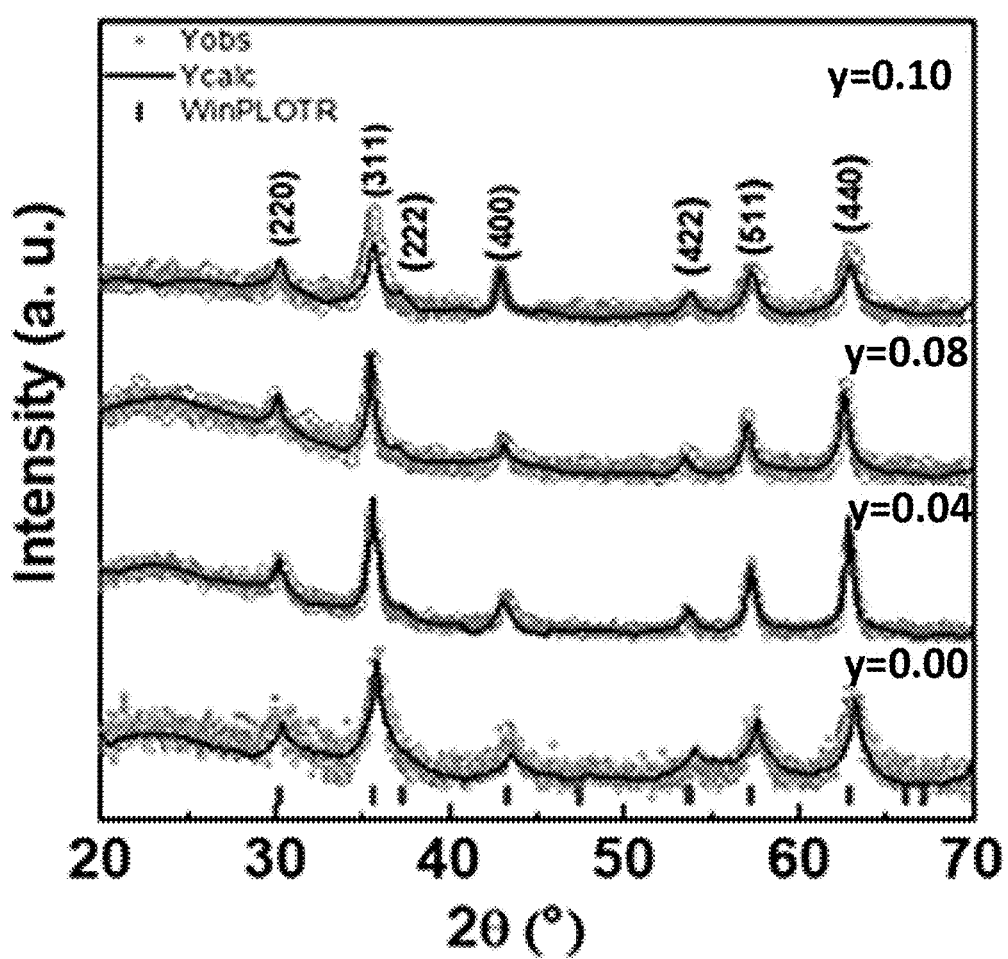

Example 4: Morphological Characterization of $Co_{0.5}Ni_{0.5}V_yFe_{2-y}O_4$ SFNPs The morphology of $Co_{0.5}Ni_{0.5}V_yFe_{2-y}O_4$ (y=0.00, 0.04, 0.08 and 0.10) SFNPs were executed by SEM and was displayed in FIG. 1A-D. The SEM images exhibited a dense of aggregation particles with inhomogeneous particle sizes distribution. The EDX elemental assessment was made to find the weight percentage of Co, Ni, V, Fe and O for $Co_{0.5}Ni_{0.5}V_yFe_{2-y}O_4$ (y=0.04) SFNPs as obvious from FIG. 1E. It found the existence of the elements without any impurities. FIGS. 1F and G represent the TEM that unveiled a cluster of cubic particles with size in the range of 30 nm. The phase analyses of $Co_{0.5}Ni_{0.5}V_yFe_{2-y}O_4$ (y=0.00, 0.04, 0.08 and 0.10) SFNPs were presented in FIG. 1H. The XRD pattern reveals the formation of Co—Ni cubic nano spinel ferrite, no undesired peaks were observed. Rietveld refinement was applied on XRD data to calculate the cell parameters and crystal size by taking account the high intensity peak (311). It was found that all cell parameters and crystal size are increased with increase the amount of vanadium (Table 1).

TABLE 1

Structural parameters of $Co_{0.5}Ni_{0.5}V_yFe_{2-y}O_4$
(y = 0.00, 0.04, 0.08 and 0.10) SFNPs.

| y | a (Å) | V (Å$^3$) | $D_{XRD}$ (nm) |
|---|---|---|---|
| 0.00 | 8.3104 | 573.9329 | 26.5 |
| 0.04 | 8.3626 | 584.8140 | 32.2 |
| 0.08 | 8.4012 | 592.9644 | 34.5 |
| 0.10 | 8.4017 | 593.0702 | 37.6 |

Example 5: Morphological Characterization of the Electrodes

Figure 2A:
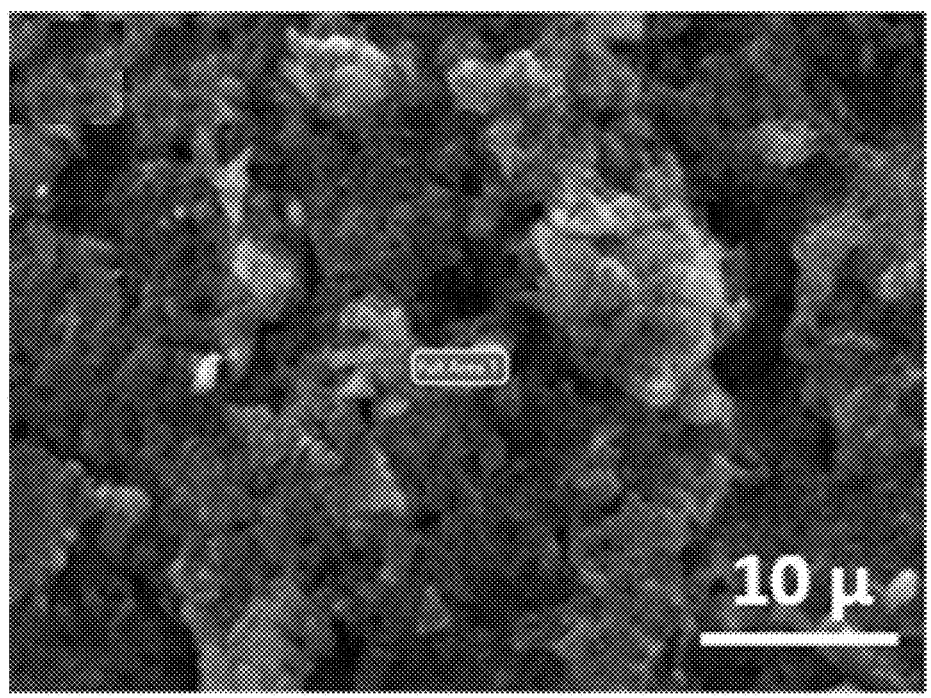
FIGS. 2A-2H illustrate A) SEM image of the 5% SFNP y=0.08 containing composite electrode, B-G) shows EDX mapping of carbon (C), oxygen (O), nickel (Ni), vanadium (V), iron (Fe), and cobalt (Co), respectively of the 5% SFNP y=0.08 containing composite electrode, H) EDX spectrum of 5% SFNP y=0.08 containing composite electrode, inset shows elemental abundances.
Figure 2B:
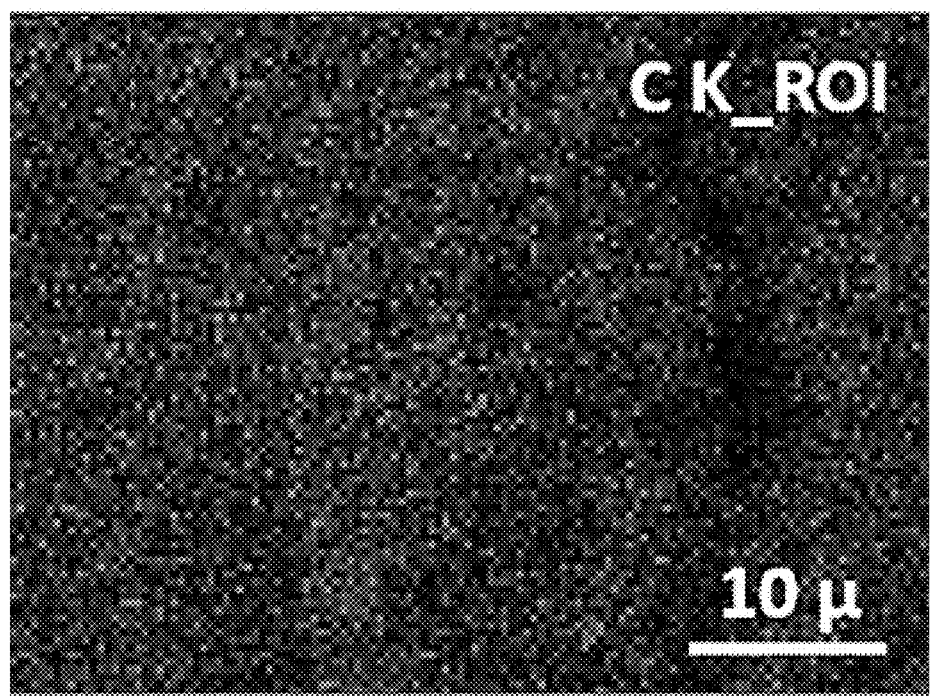
Figure 2C:
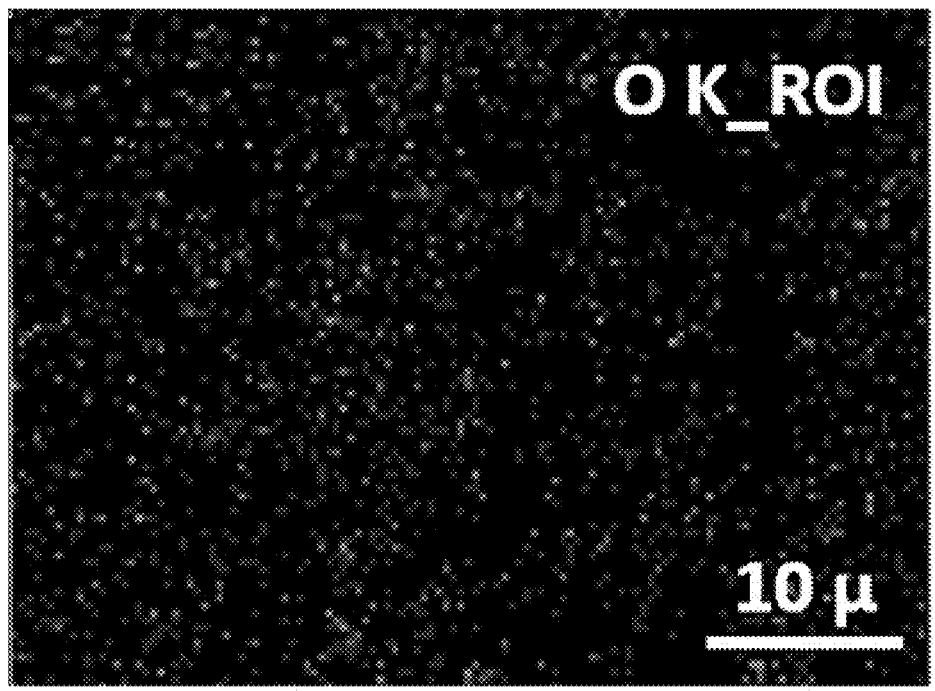
Figure 2D:
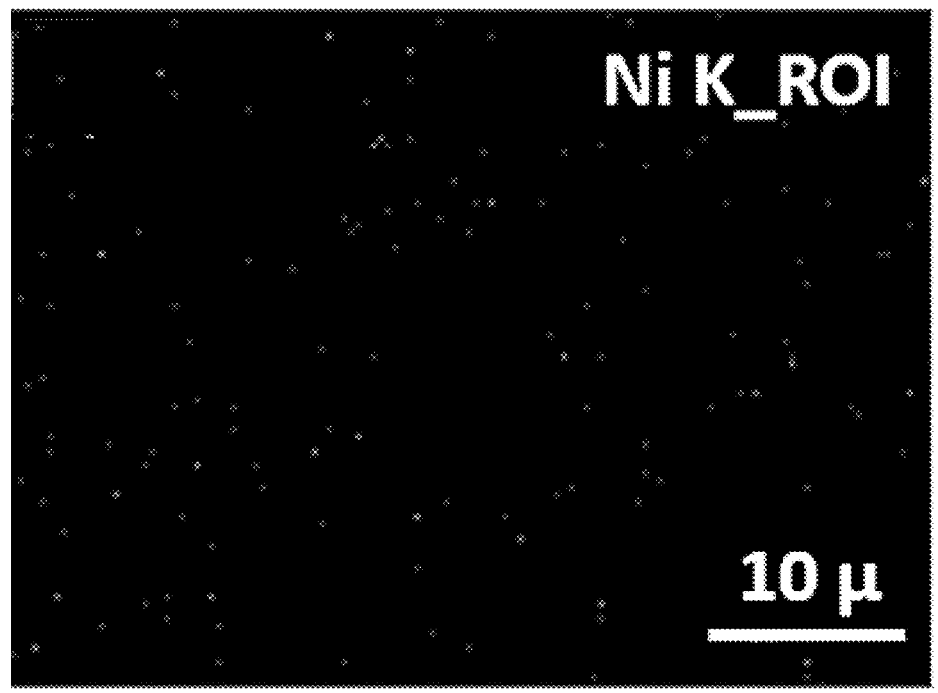
Figure 2E:
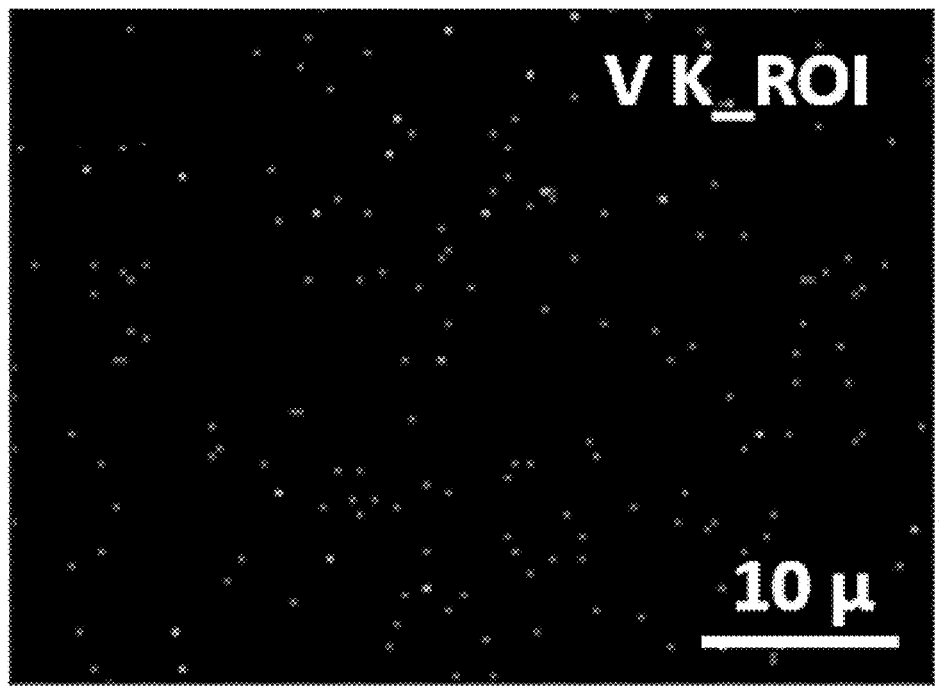
Figure 2F:
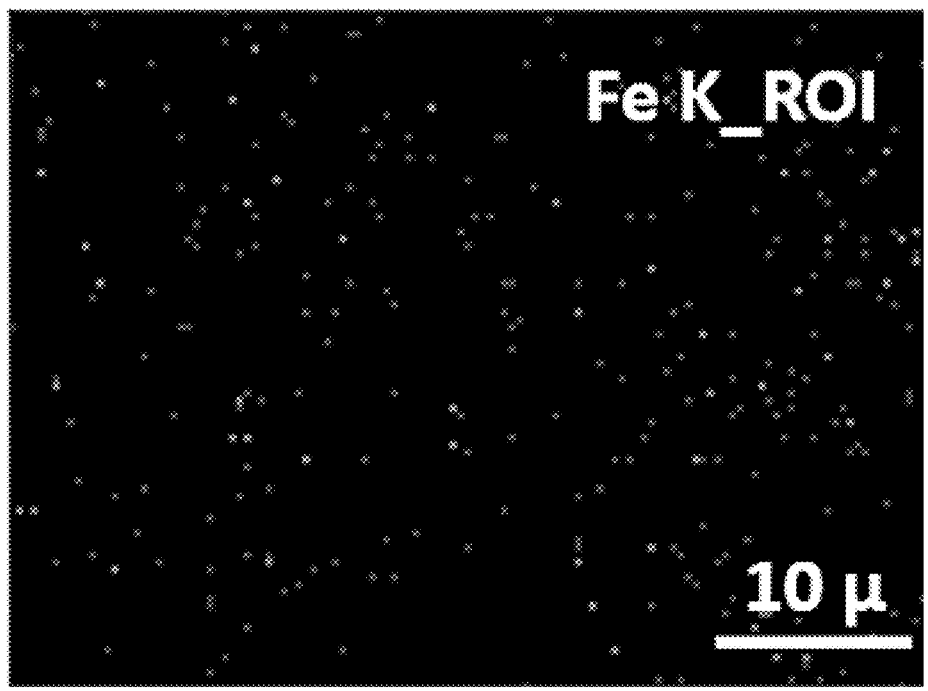
Figure 2G:
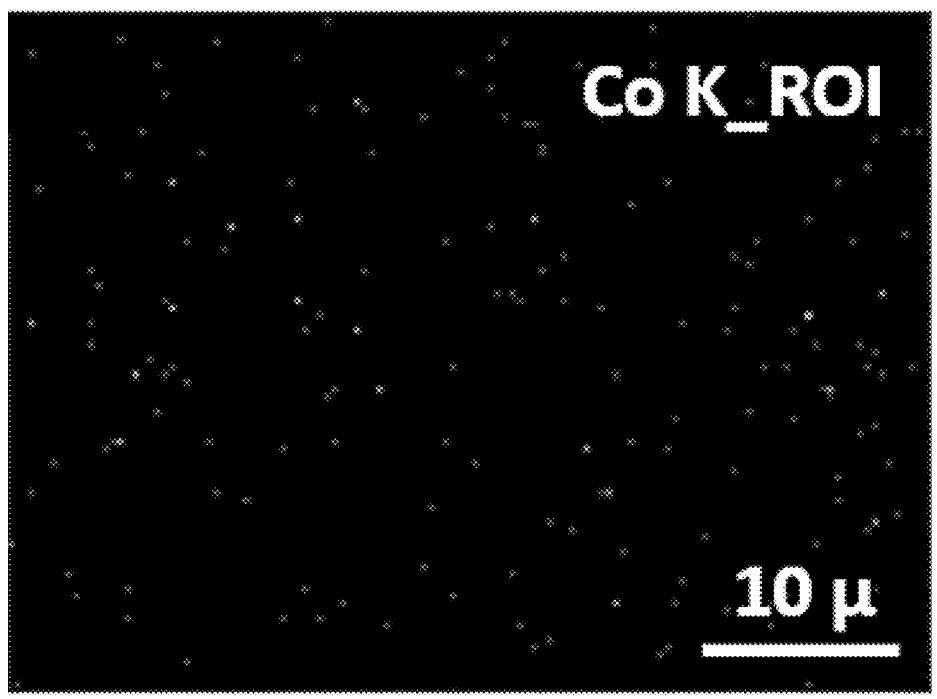
Figure 2H:
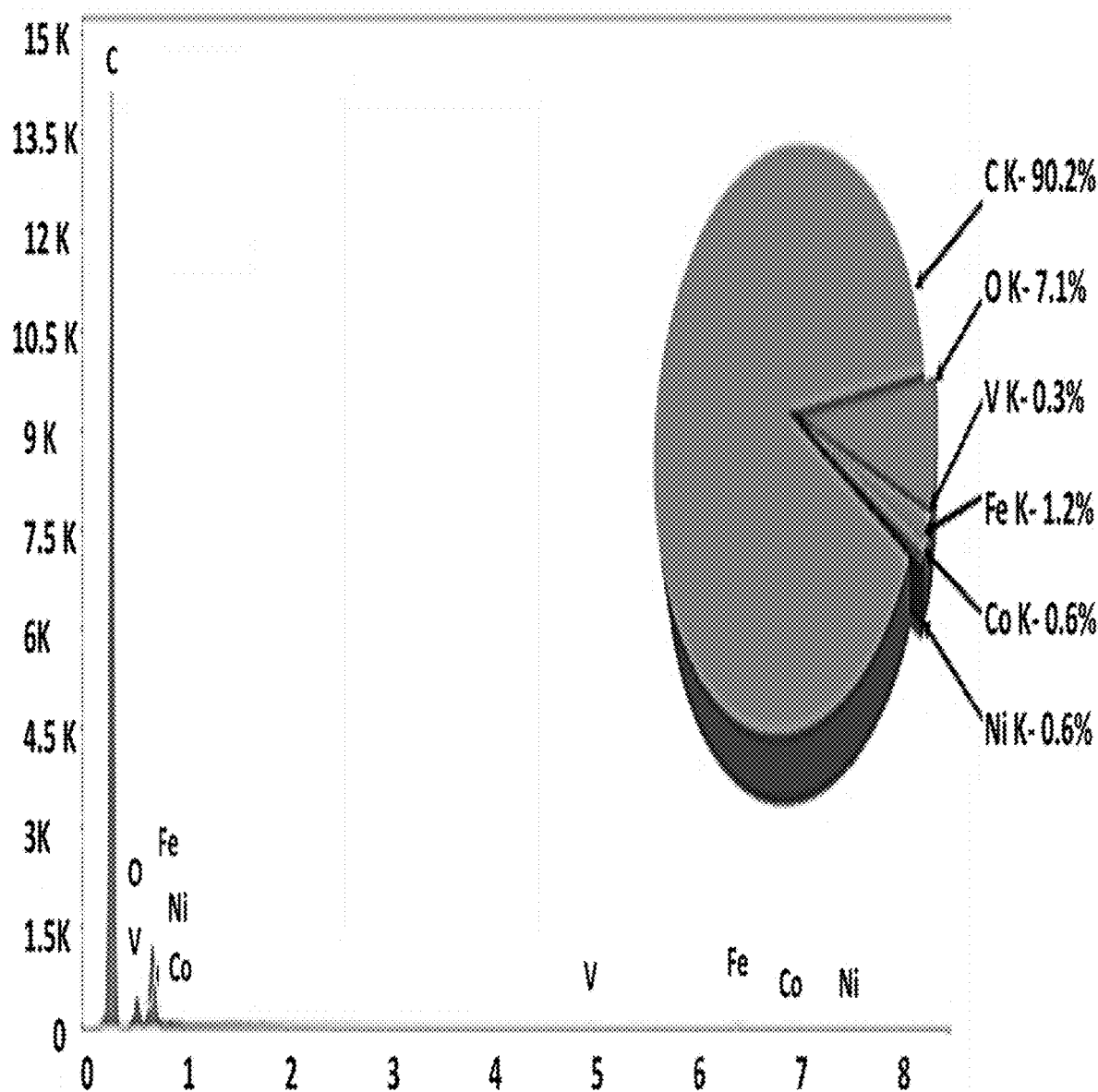

FIG. 2A shows the SEM image of 5% SFNPs y=0.08 containing carbon composite electrode. It can be observed that the electrode has significant porosity which reflects that the incorporation of carbon and SFNPs. This improves the hydrophilic behavior and increase the electrolyte adsorption capacity thus contribute the device capacitance. The homogeneous dispersion of SFNPs into the carbon composite matrix was studied by EDX mapping (FIG. 2B-G). The EDX mapping of sample confirms the homogeneous dispersion of all essential elements including nickel (Ni), vanadium (V), iron (Fe), and cobalt (Co). Corresponding EDX spectra presents the abundancy of the elements in the nanocomposite structure.

Figure 3A:
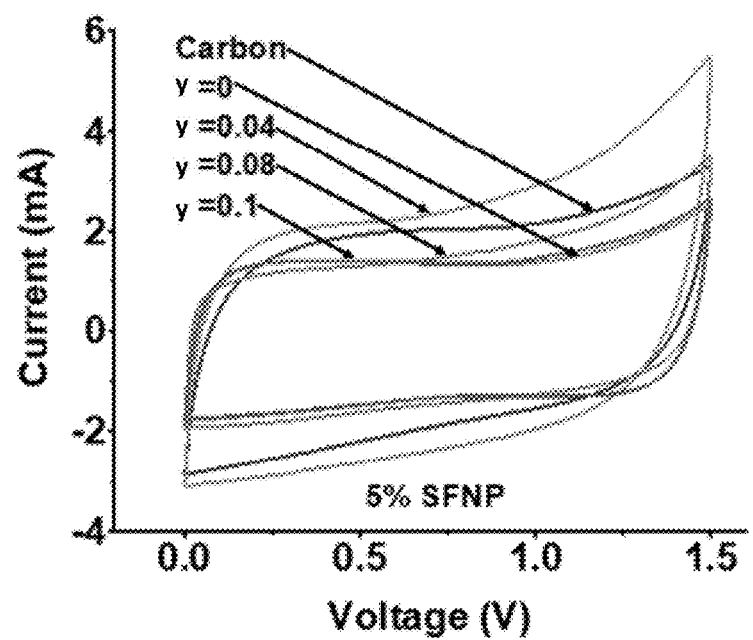
FIGS. 3A-3F are graphs illustrating the CV voltammograms of A) carbon and 5% SFNPs at different weight rations (y=0.00, 0.04, 0.08 and 0.10) at scan rate of 10 mV $s^{-1}$, B) carbon and y=0.04 composite with different percentage from SFNPs at scan rate of 10 mV $s_{-1}$, C) 5% SFNPs (y=0.00, 0.04, 0.08 and 0.10) in a voltage domain of 0-1.5 V at scan rate of 200 mV $s^{-1}$, D) Specific capacitance for all fabricated electrodes calculated from CV at 10 mV $s^{-1}$ E) Nyquist plots of carbon and 5% SFNPs (y=0.00, 0.04 0.08 and 0.10), inset shows Nyquist plots at high frequency region, F) equivalent circuit model.
Figure 3B:
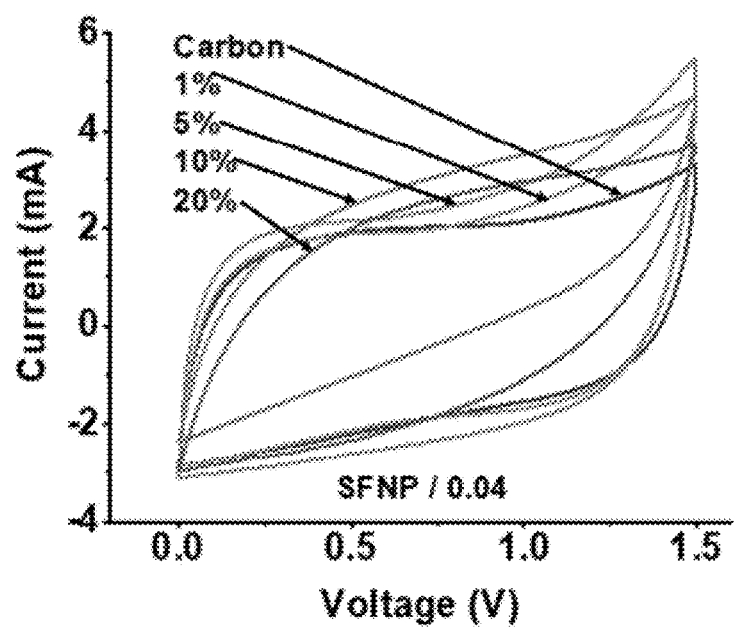
Figure 3C:
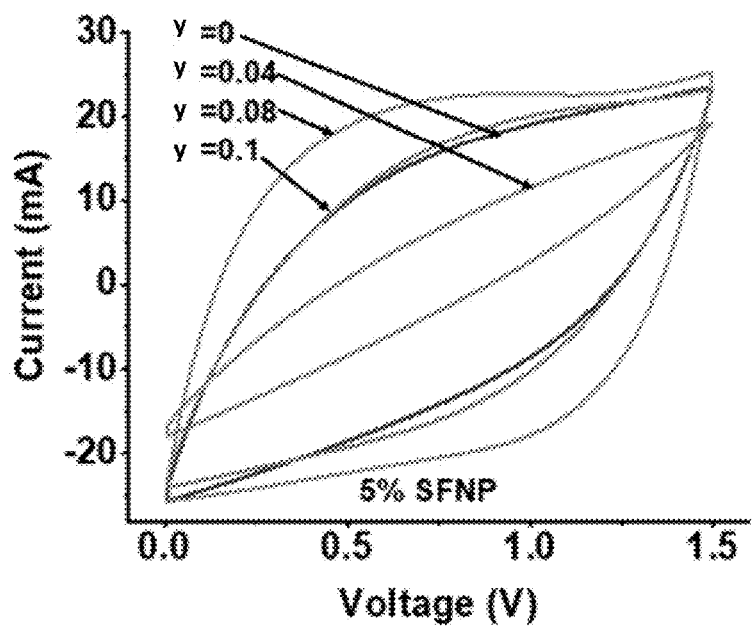
Figure 3D:
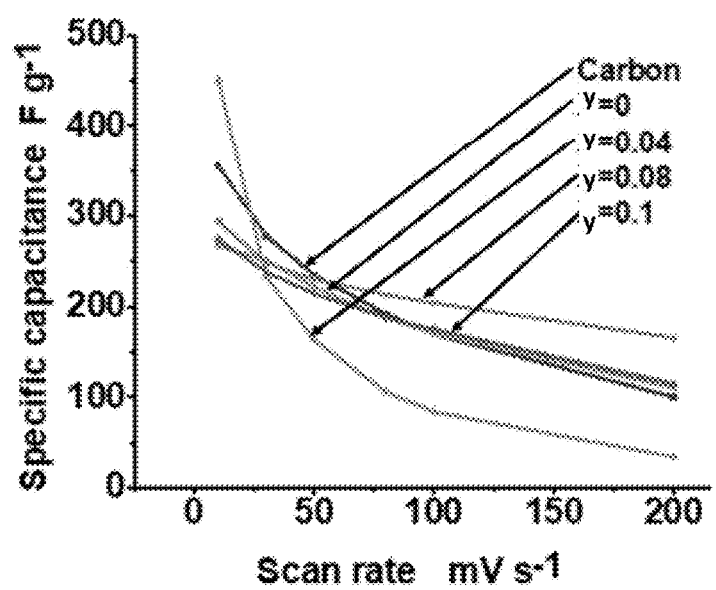

Example 6: Electrochemical Characterization of the Electrodes and Supercapacitors FIG. 3A depicts the CV plot of 5% SFNPs (y=0.00, 0.04, 0.08 and 0.10) modified supercapacitors and original carbon composite-based supercapacitors which were tested at scan rate of 10 mV s$^{-1}$. Measurements were performed at a large potential window 0-1.5 V which contribute to the device in terms of capacitance and energy density. The supercapacitor device containing 5% SFNPs y=0.04 was shown the highest capacitance compared to the other devices. The rectangular CV voltammograms were obtained from all devices which indicate relatively comparable capacitive behavior. The area under the forward-reverse scans of the CV voltammogram after SFNPs addition (y=0) to the electrode was observed reduced slightly. The capacitance increases of 28% was calculated by area under the CV curves after addition of SFNPs (y=0.04) indicating the presence of vanadium contribute Faradaic reactions and increased the specific capacitance. Further increase in the ratio of y (y=0.08 and 0.10) caused a decrease in the device capacitances at 10 mV s$^{-1}$. To determine the optimized SFNPs included weight fraction, electrodes containing different percentages of SFNPs were tested at a scan rate of 10 mV s$^{-1}$ and a potential range of 0-1.5 V (FIG. 3B). It was observed that the highest capacitance was obtained for the device containing SFNPs 5% (w/w). The main challenge of supercapacitors is low efficiency and sudden voltage drop at high current density. The rate capability at high current of the supercapacitors containing 5% SFNPs (y=0.00, 0.04, 0.08 and 0.10) were tested at high scan rate was at 200 mV s$^{-1}$ in a potential range of 0-1.5 V (FIG. 3C). Interestingly, the device having the ratio of y=0.08 yielded highest capacitive performance compared to y=0.04. This can be explained by the Faradaic contribution of vanadium presence in the electrode structure. The rate capability of the supercapacitors was tested at different scanning speeds between 10-200 mV s$^{-1}$. The device containing 5% SFNPs y=0.08 was maintained its quasi-rectangular CV shapes in forward-reverse at low and high scanning rates attributing a superior diffusion-controlled charge transfer. FIG. 3D shows capacitance comparison of different supercapacitor devices calculated by using the Eq. (1) from the CV measurements. Although the highest capacitance was obtained for 5% SFNPs y=0.04 containing device at low scan rate, the capacitive behavior of the 5% SFNPs y=0.08 device become favorable at scanning speed.

$$C_s = \frac{\int I \times \Delta V}{m \times \Delta V \times v} \quad (1)$$

where, $\int I \times \Delta V$ shows CV area under the forward-reverse scan, m represents the mass of active material, v is the scan rate, and $\Delta V$ is the voltage window.

Figure 3E:
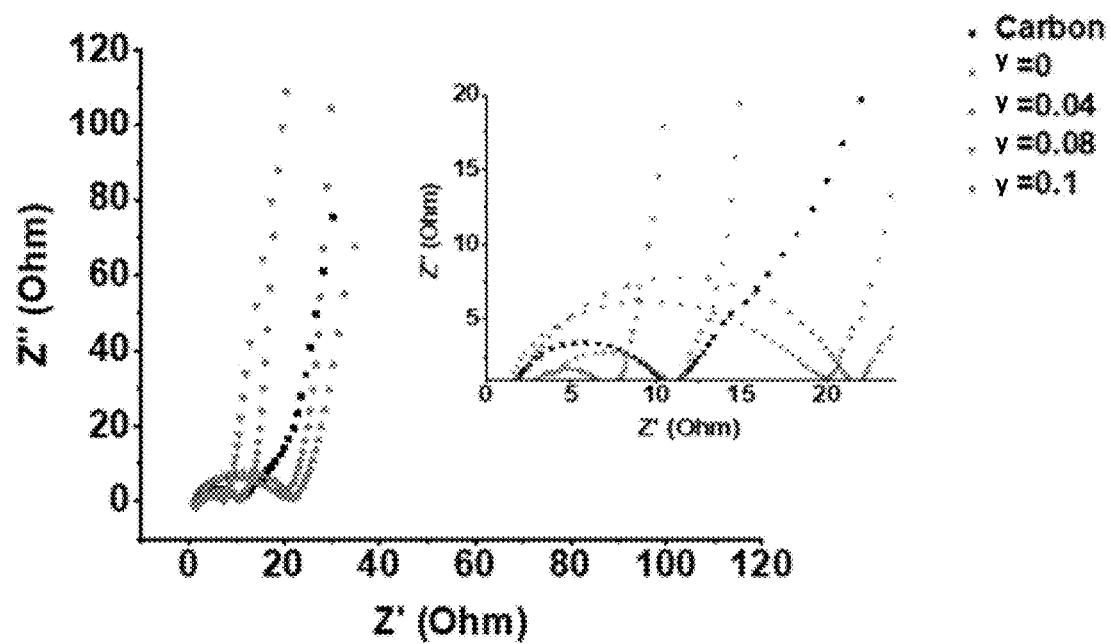
Figure 3F:
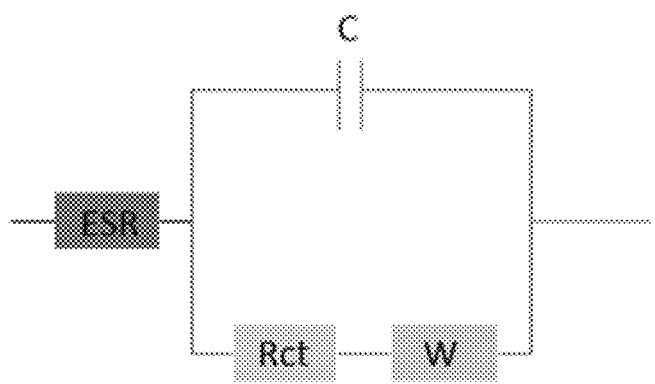

FIG. 3E shows Nyquist graphs via electrochemical impedance spectroscopy corresponding to the different compositions of 5% SFNPs (y=0.00, 0.04, 0.08 and 0.10) and reference carbon-based supercapacitors. Equivalent series resistance (ESR) correlated to internal resistance of the electrodes was obtained from the x-axis intersections of the curves. The ESR value of 4.1 Ohm is obtained from the device containing y=0.1 which is higher than y=0.00, 0.04, 0.08 and pure carbon-based devices (1.6, 1.7, 2.5 and 1.7 ohm, respectively). The negligible increase in the ESR values by increasing presence of vanadium in the composites was observed due to the semi-conducting nature of vanadium oxide nanostructures. However, the radius of semicircle showing the charge transfer resistance (Rct), is obtained from the device containing y=0.08 are smaller than those of y=0.00, 0.04, 0.08 and pure carbon-based devices. This shows the superior compatibility of the vanadium with the composite electrode which decrease the charge transfer resistivity yielded high-rate capability. An equivalent circuit diagram was used to obtain the Rct data by fitting the results obtained impedance measurements. Results shows vanadium presence in the electrode composite allow a faster ion transfer. A diffusion-controlled process is observed according to Warburg impedance is represented a straight line in the region of low-frequency at all devices.

Figure 4A:
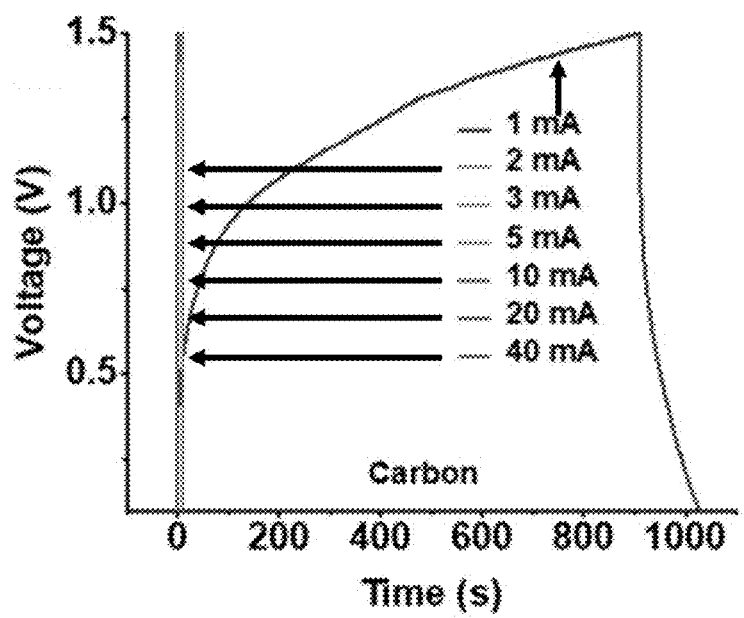
Figure 4B:
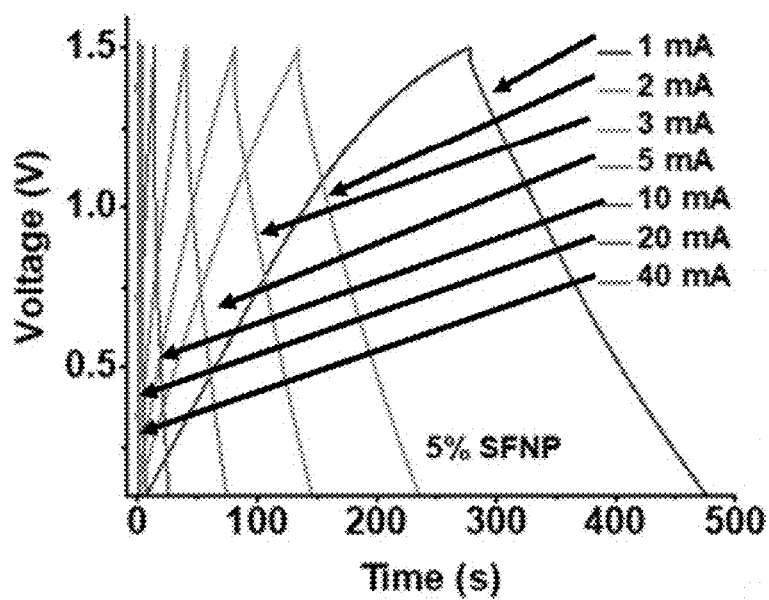
Figure 4C:
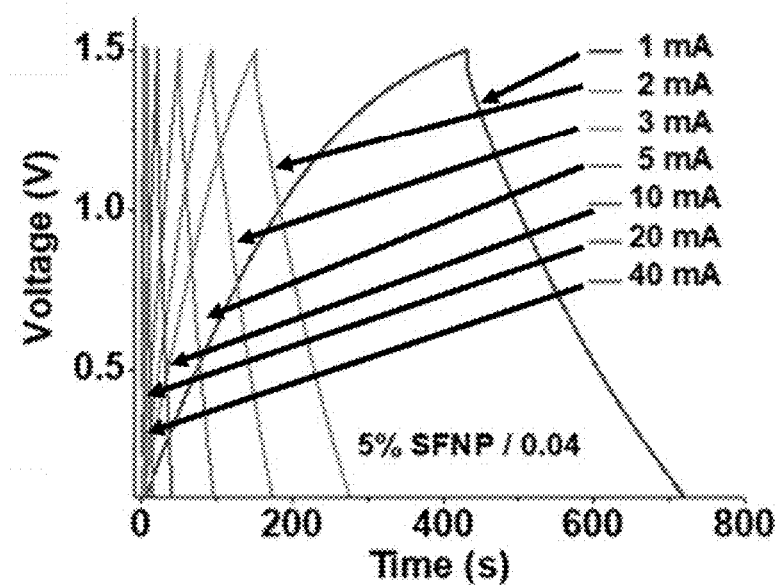
Figure 4D:
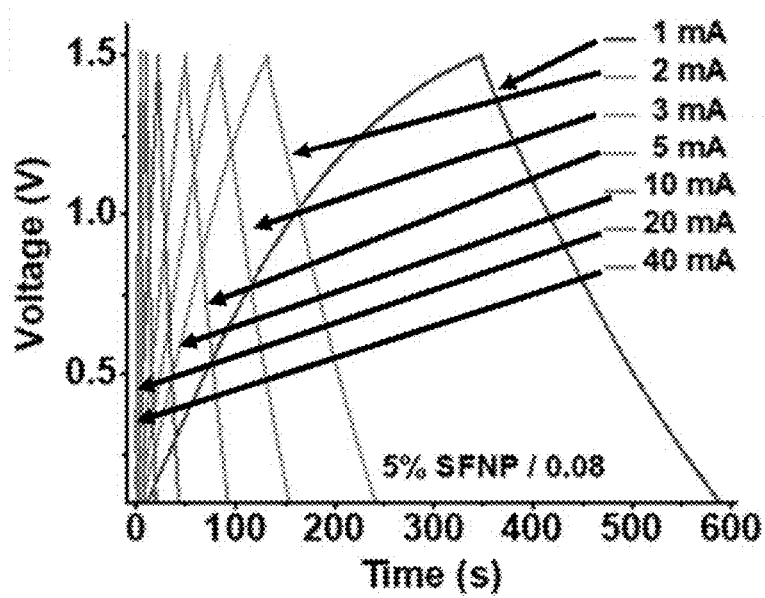
Figure 4E:
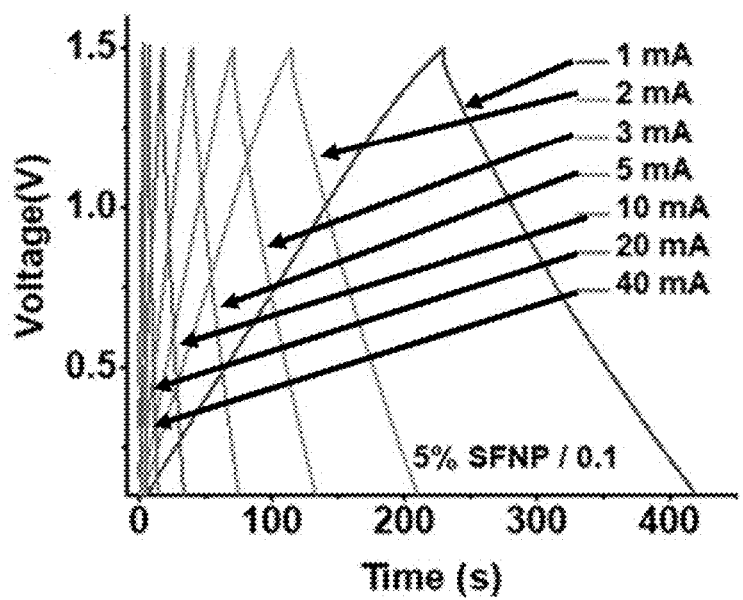

The galvanostatic charge-discharge (GCD) profile of the fabricated supercapacitors was performed in the potential window of 1.5 V at different current densities as presented in FIG. 4A-F. Each device is analyzed for different constant current values ranging from 1 mA to 40 mA to examine the performance at higher current values. FIG. 4A represents the GCD of the pure carbon (without SFNP) supercapacitor that shows high charging time indicating low capacitance and poor coulombic efficiency. After the modification, carbon electrodes are modified with spinel ferrite nano particles (SFNPs), the supercapacitor exhibits enhancement in the specific capacitance and improved coulombic efficiency. FIG. 4B shows the GCD analysis of 5% SFNPs at y=0.0 (i.e., absence of vanadium) to carbon composite electrodes which exhibit a specific capacitance of 253.87 F g$^{-1}$ at 1 mA. Similarly, FIG. 4C represents GCD analysis for 5% SFNPs at y=0.04 which was performed superior discharge time and columbic efficiency in GCD analysis. The specific capacitance obtained from the y=0.04 containing device is 349.69 F g$^{-1}$ at 1 mA, which is the highest value as compared to other concentrations. The further analysis reveals that as the y-value is increased, the specific capacitance shows decreasing trend as given in FIG. 4D-E for y=0.08, 0.10 respectively. The $Co_{0.5}Ni_{0.5}V_xFe_{2-x}O_4$ SFNPs with y=0.04 is considered as optimum performance at low current rates. GCD analysis at different operating voltage windows show the device capability of charge-discharge at efficiency. Unlike the pure carbon supercapacitor device, all SFNP containing devices showed a well maintained GCD curves at higher voltage rates.

A comparative GCD analysis is presented in FIG. 4F for all the x-values at high current rate of 40 mA. It was observed that the highest specific capacitance is obtained for sample y=0.08 which is calculated to be 85.33 F g$^{-1}$ two-fold higher than y=0.04 38.04 F g$^{-1}$ at the same discharging current. The supercapacitors show IR drop behavior at 40 mA, and the asymmetric charge-discharge GCD profile reveals a limited drop despite the large current drawn from the device (IR drop: 0.25 V, y=0.08). This result demonstrates the efficient use of the specific capacitance obtained from the device at high energy density. Therefore, the addition of vanadium to SFNPs is important at high current values as well as at low current values because of its electrochemical stability. The vanadium-free sample (y=0) exhibits much lower specific capacitance (3.56 F g$^{-1}$ at 40 mA) than the vanadium-containing SFNP supercapacitors.

Figure 5A:
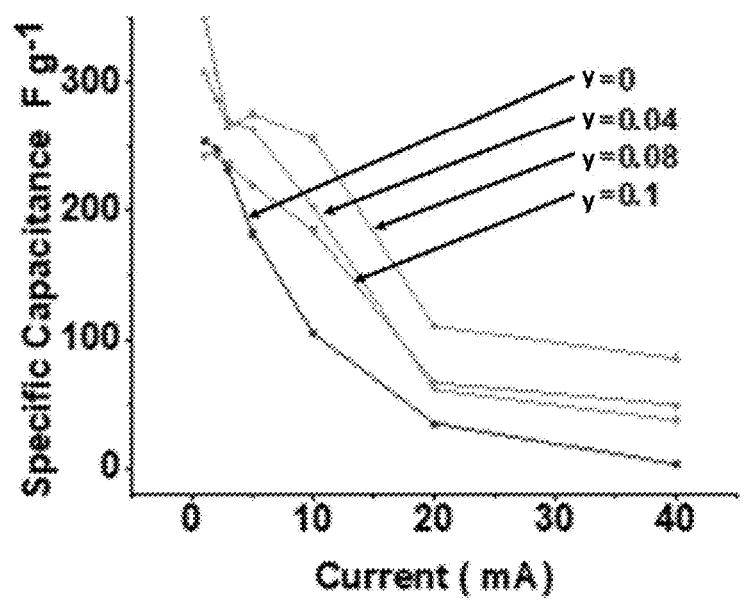

FIG. 5A shows a comparison of the specific capacitances of the fabricated supercapacitors for (y=0.00, 0.04, 0.08 and 0.10) calculated from the GCD data at various current values (Eq. 2).

$$Cs, \text{cell} = I \int Vdt/w \times \Delta V \qquad (2)$$

∫Vdt is the area under the discharge curve (GCD curve), ΔV operating voltage range; initial voltage–final voltage.

The specific capacitance of 349.69 F g$^{-1}$ is achieved for y=0.04 at 1 mA whereas the further increase in the current shows a decreasing trend. It is noticeable that the specific capacitance for y=0.08 becomes larger as compared to its other counterparts at high current values (40 mA).

Figure 5B:
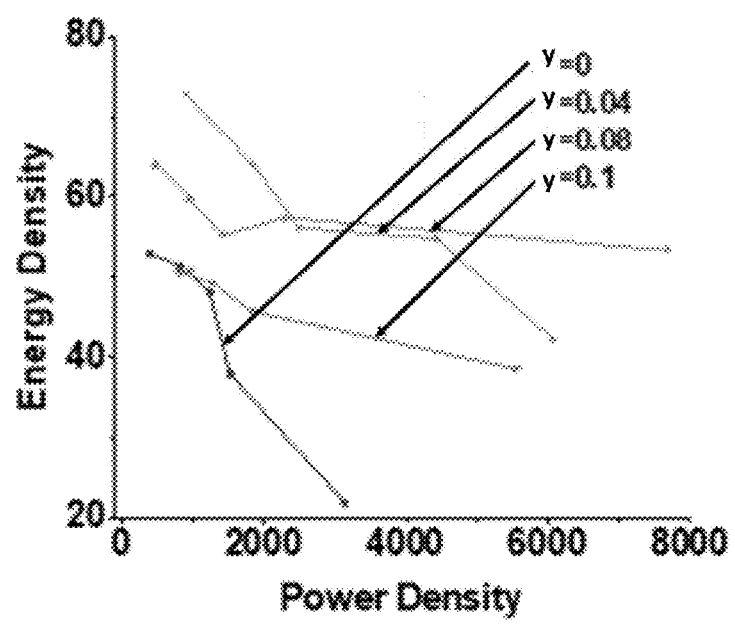

Energy density and power density of the fabricated supercapacitors are presented in the form of Ragone plot as shown in FIG. 5B. The highest energy density value of 72.85 Wh kg$^{-1}$ is achieved for y=0.04 supercapacitor at a power density of 903.12 W kg$^{-1}$. Supercapacitor energy and power densities were calculated by using Eqs. 3 and 4.

$$E = \frac{1}{8} \times Cs \times (\Delta V^2)/3.6 \qquad (3)$$

$$P = E \times (3600/\Delta t) \qquad (4)$$

where ΔV is the voltage window, Δt is discharge time, E is energy density, and P is power density. The energy density of 5% SFNPs (y=0.08) modified supercapacitor yielded excellent stability of energy density at low and high-power densities. The devices showed energy density 64.35 Wh kg$^{-1}$ at a power density of 745 W kg$^{-1}$. The same device was maintained 89% of its initial energy density performance even at high power density (57.24 Wh kg$^{-1}$ at a power density of 7.900 W kg$^{-1}$).

Figure 5D:
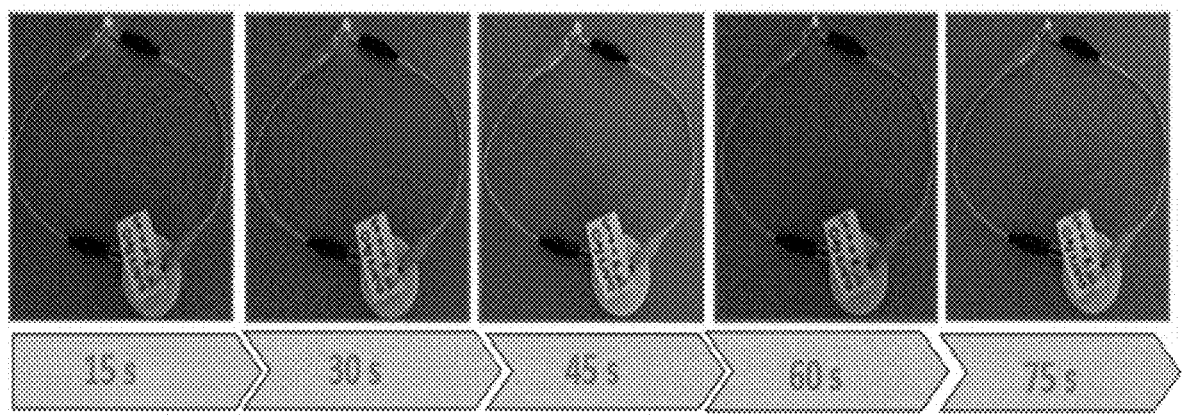
Figure 5E:
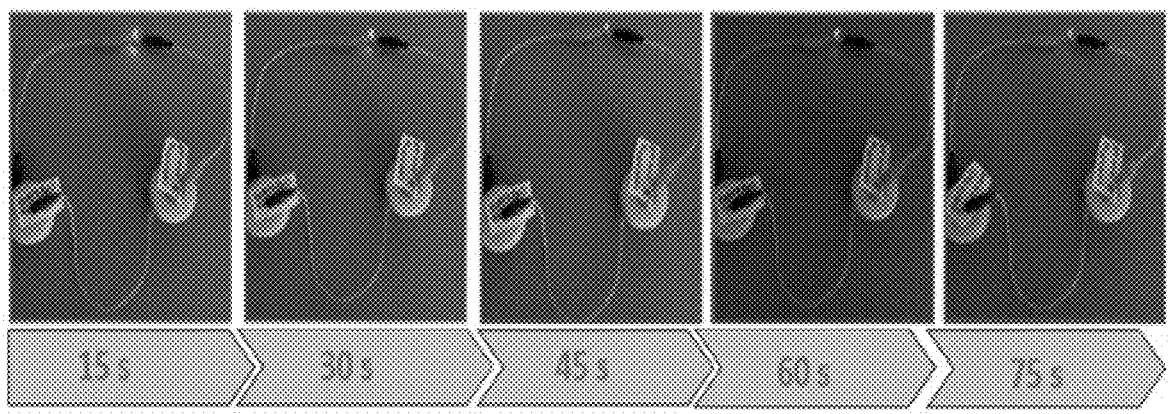

FIG. 5C shows two identical supercapacitors in series and parallel combinations. It is observed the series connection of two supercapacitors is performing well in a large potential window of 3 V. Similarly, the parallel combination of two supercapacitors takes nearly double the discharge time as compared to single supercapacitor for one complete cycle of charging-discharging indicating the excellent reversibility of the device. Further, the operational performance of devices was tested by RGB (red-green-blue) LED using single supercapacitor (5% SFNPs with y=0.04). The LED operating timeline was shown in FIG. 5D with an intensity of LED. Single device was successfully powered the LED for more than a minute, however the red color being prominent due to low working potential reach. The same LED is powered using two identical supercapacitors in series connection as shown in FIG. 5E. The LED shows green color in the beginning due to the large potential window provided by the series connection of the supercapacitors but turns red after 60 seconds due to the low potential because of discharging of the device.

Figure 6A:
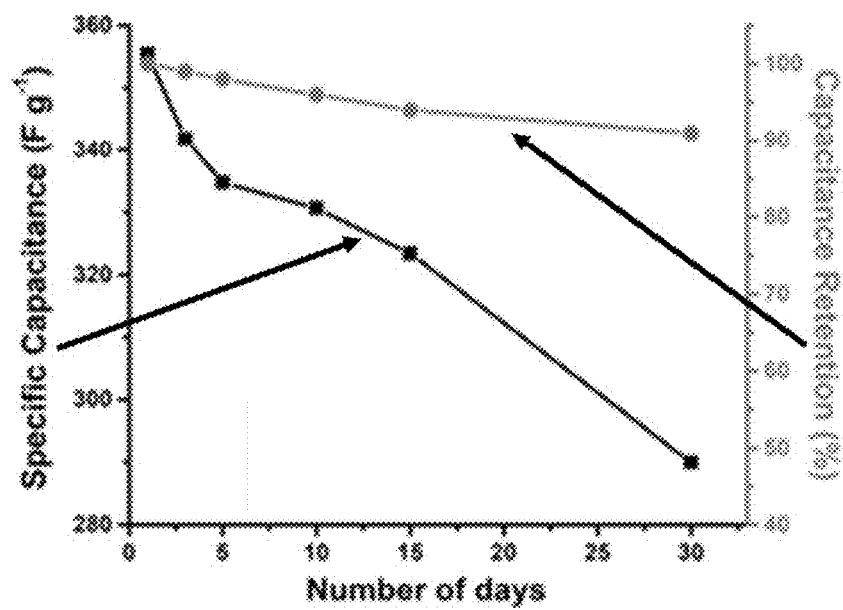
FIGS. 6A-6B are graphs illustrating the A) specific capacitance and capacitance retention vs days, B) Specific capacitance and Coulombic efficiency vs cycle number.
Figure 6B:
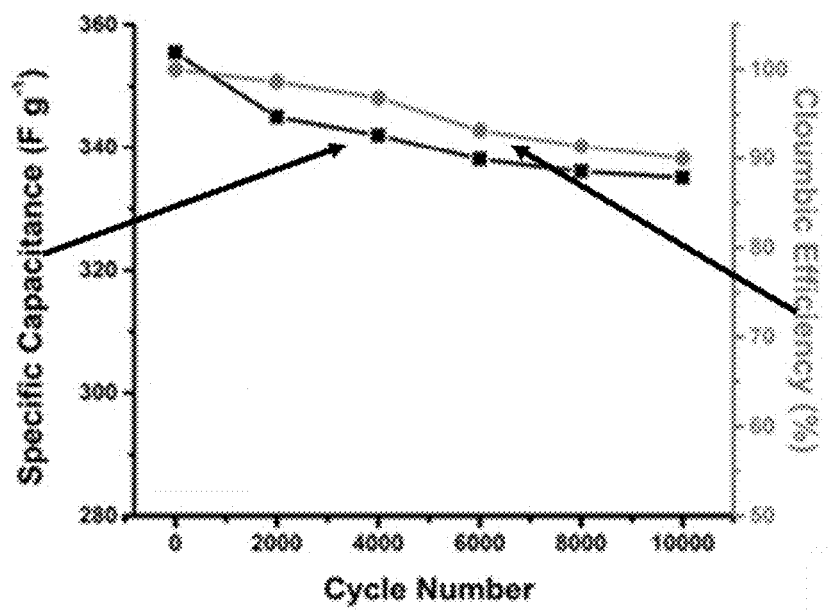

The stability of the device (5% SFNPs at y=0.04) was tested under continuous working of 30 days in the same environment at room temperature. The specific capacitance of the supercapacitor was decreased from 358 F g$^{-1}$ to 290 F g$^{-1}$ even after 30 days of working (FIG. 6B). The capacitance retention of the device after 30 days of working was calculated to be 90% of its initial capacitance which specifies the long-term stability of the device. In addition, the cycling stability of the device was also tested for 10,000 continuous charge-discharge cycles at a constant current of 1 mA. FIG. 6B shows specific capacitance and coulombic efficiency as function of cycle numbers. The device exhibits excellent cycling durability in term of capacitance retention with improved coulombic efficiency. The device demonstrates more than 90% of the coulombic efficiency even after 10,000 charge discharge cycles. Hence, the addition of metal ferrites to carbon-based supercapacitors would likely to improve the energy density values by increasing the potential window of the device which is the major drawback of the carbon-based supercapacitors.

Herein, a vanadium doping of Co—Ni based spinel ferrites ($Co_{0.5}Ni_{0.5}V_yFe_{2-y}O_4$), SFNPs (with y=0.00, 0.04, 0.08 and 0.10) was synthesized via low-cost hydrothermal method. The electrochemical storage capability of carbon-based nanocomposite electrodes was improved by insertion of SFNPs, thus the electrochemical performance of assembled devices reached maximum specific capacitance of 349.69 F $g^{-1}$ (y=0.04) at a current density of 1 mA. Further, the device has revealed an excellent performance retention after 10.000 cycles with a coulombic efficiency of 90%. The energy density of the device including y=0.04 provided a specific energy of 72.85 Wh $kg^{-1}$ at specific power of 903.12 $Wkg^{-1}$. High current rate performance was reached from the device containing y=0.08 yielded an outstanding charge-discharge performance at 40 mA. The device maintained almost 90% of its initial energy density even at high power density (57.24 Wh $kg^{-1}$ at a power density of 7.900 W $kg^{-1}$). The assembled device (dimension of 1.8 $cm^2$) has successfully powered the RGB LED light after charging to 2.5 V. Results shows a facile and low-cost production of vanadium doped ternary ferrite nanomaterials that illustrated excellent high-rate electrochemical performance and provided synergistic effects in the active carbon-based electrodes which can used for advance energy systems.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A nanocomposite supercapacitor, comprising:
   first and second nanocomposite electrodes, a membrane separator and an electrolyte,
   wherein the first nanocomposite electrode comprises a first substrate and the second nanocomposite electrode comprises a second substrate,
   wherein the electrolyte and the membrane separator are between and in direct contact with the first and second electrodes,
   wherein both the first and the second substrates are made from at least one material selected from the group consisting of stainless steel, aluminum, nickel, copper and platinum;
   wherein both the first and the second substrates are coated on a surface contacting the membrane separator with a nanocomposite mixture comprising:
   polyvinylidene fluoride as a binding compound;
   at least one carbonaceous compound; and
   vanadium doped spinel ferrite nanoparticles (V-SFNPs);
      wherein the V-SFNPs have a formula of $Co_xNi_{1-x}V_yFe_{2-y}O_z$;
      wherein x=0.1-0.9, y=0.01-0.10, and z=3-5.

2. The nanocomposite supercapacitor of claim 1, wherein the V-SFNPs have:
   a substantially spherical shape;
   an average size of 10-1000 nm.

3. The nanocomposite supercapacitor of claim 1, wherein the V-SFNPs comprises:
   20-30 wt % oxygen, 1-10 wt % vanadium, 40-50 wt % iron, 10-20 wt % cobalt, and 10-20 wt % nickel, based on the total weight of the oxygen, vanadium, iron, cobalt, and nickel.

4. The nanocomposite supercapacitor of claim 1, wherein the nanocomposite mixture comprises:
   1-20 wt. % of the V-SFNPs; and
   80-99 wt. % of the binding compound, and the carbonaceous compound based on the total weight of the V-SFNPs, the binding compound, and the carbonaceous compound.

5. The nanocomposite supercapacitor of claim 1, having:
   85-92 wt % carbon, 5-10 wt % oxygen, 0.1-2 wt % vanadium, 0.5-2 wt % iron, 0.5-1 wt % cobalt, and 0.5-1 wt % nickel, based on the total weight of the carbon, oxygen, vanadium, iron, cobalt, and nickel.

6. The nanocomposite supercapacitor of claim 1, wherein:
   the carbonaceous compound is at least one selected from the group consisting of graphite, activated carbon, reduced graphene oxide, carbon nanotubes, carbon nanofibers, and carbon black.

7. The nanocomposite supercapacitor of claim 1, wherein:
   the electrolyte is at least one selected from a group consisting of an alkali metal salt and an alkaline earth metal salt;
   wherein the electrolyte has a molarity of 1-10 in water.

8. The nanocomposite supercapacitor of claim 1, wherein:
   the membrane separator is selected from a group consisting of a polypropylene membrane, a glass fiber membrane, and a cellulose fiber membrane.

9. The nanocomposite supercapacitor of claim 1, having:
   an energy density of 50-80 Wh/kg at a power density of 500-8000 W/kg.

10. The nanocomposite supercapacitor of claim 1, having:
   a specific capacitance of 325-375 F/g at 1 mA.

11. The nanocomposite supercapacitor of claim 10, wherein:
   at least 90% of an initial specific capacitance is maintained after 10,000 charge discharge cycles.

12. The nanocomposite supercapacitor of claim 1, wherein the V-SFNPs are made by a method comprising:
   mixing a cobalt (II) salt, a nickel salt, an iron (III) salt, and a vanadium (III) salt in water to form a mixture;
   adjusting the pH of the mixture to 10-12 with a base to form a basic mixture;
   heating the basic mixture to 150-200° C. for 10-20 hours to form a powder; and
   washing the powder with water and drying at a temperature of 60-80° C. to form the V-SFNPs.

* * * * *